United States Patent [19]

Yamada

[11] Patent Number: 4,486,788
[45] Date of Patent: Dec. 4, 1984

[54] METHOD FOR PRODUCING A HALFTONE PLATE FOR USE IN A PICTURE REPRODUCING MACHINE

[75] Inventor: Mitsuhiko Yamada, Kyoto, Japan

[73] Assignee: Dainippon Screen Seizo Kabushiki Kaisha, Kyoto, Japan

[21] Appl. No.: 365,890

[22] Filed: Apr. 6, 1982

[30] Foreign Application Priority Data

Apr. 14, 1981 [JP] Japan .................. 56-55841

[51] Int. Cl.³ .................. H04N 1/24; H04N 1/40
[52] U.S. Cl. .................. 358/298; 358/283; 358/302
[58] Field of Search .................. 358/298, 283, 302

[56] References Cited

U.S. PATENT DOCUMENTS

| | | | |
|---|---|---|---|
| 4,110,796 | 8/1978 | Aughton | 358/298 |
| 4,342,051 | 7/1982 | Suzuki | 358/298 |
| 4,365,275 | 12/1982 | Berman | 358/298 |
| 4,413,286 | 11/1983 | Boston | 358/298 |

Primary Examiner—Howard W. Britton
Attorney, Agent, or Firm—Yuter, Rosen & Dainow

[57] ABSTRACT

A method for producing a halftone plate from an original picture having a continuous tone directly, for use in a picture reproducing machine such as a color scanner and a color facsimile, wherein a reproduction picture is recorded on a photosensitive material by means of a plurality of exposure light beams which are independently modulated by picture signals obtained by scanning the original picture, wherein a halftone dot area is quantized into picture elements depending on a screen angle approximate to the desired screen angle, whose tangent value is a rational number, and the picture elements are indentified by address numbers in a predetermined order, wherein data for halftone dot area rates and forms of halftone dot patterns are stored in addresses of memories to be addressed by a common address, and then one of the memories is selectd depending on the picture signals, and wherein the data is read out of the selected memory, and the exposure light beams are controlled by the read-out data.

13 Claims, 26 Drawing Figures

FIG. 11

| 238 | 174 | 110 | 46 | 223 | 159 | 95 | 31 | 208 | 144 | 80 | 16 | 193 | 129 | 65 | 1 | 178 | 114 | 50 |
|---|---|---|---|---|---|---|---|---|---|---|---|---|---|---|---|---|---|---|
| 239 | 175 | 111 | 47 | 224 | 160 | 96 | 32 | 209 | 145 | 81 | 17 | 194 | 130 | 66 | 2 | 179 | 115 | 51 |
| 240 | 176 | 112 | 48 | 225 | 161 | 97 | 33 | 210 | 146 | 82 | 18 | 195 | 131 | 67 | 3 | 180 | 116 | 52 |
| 241 | 177 | 113 | 49 | 226 | 162 | 98 | 34 | 211 | 147 | 83 | 19 | 196 | 132 | 68 | 4 | 181 | 117 | 53 |
| 1 | 178 | 114 | 50 | 227 | 163 | 99 | 35 | 212 | 148 | 84 | 20 | 197 | 133 | 69 | 5 | 182 | 118 | 54 |
| 2 | 179 | 115 | 51 | 228 | 164 | 100 | 36 | 213 | 149 | 85 | 21 | 198 | 134 | 70 | 6 | 183 | 119 | 55 |
| 3 | 180 | 116 | 52 | 229 | 165 | 101 | 37 | 214 | 150 | 86 | 22 | 199 | 135 | 71 | 7 | 184 | 120 | 56 |
| 4 | 181 | 117 | 53 | 230 | 166 | 102 | 38 | 215 | 151 | 87 | 23 | 200 | 136 | 72 | 8 | 185 | 121 | 57 |
| 5 | 182 | 118 | 54 | 231 | 167 | 103 | 39 | 216 | 152 | 88 | 24 | 201 | 137 | 73 | 9 | 186 | 122 | 58 |
| 6 | 183 | 119 | 55 | 232 | 168 | 104 | 40 | 217 | 153 | 89 | 25 | 202 | 138 | 74 | 10 | 187 | 123 | 59 |
| 7 | 184 | 120 | 56 | 233 | 169 | 105 | 41 | 218 | 154 | 90 | 26 | 203 | 139 | 75 | 11 | 188 | 124 | 60 |
| 8 | 185 | 121 | 57 | 234 | 170 | 106 | 42 | 219 | 155 | 91 | 27 | 204 | 140 | 76 | 12 | 189 | 125 | 61 |
| 9 | 186 | 122 | 58 | 235 | 171 | 107 | 43 | 220 | 156 | 92 | 28 | 205 | 141 | 77 | 13 | 190 | 126 | 62 |
| 10 | 187 | 123 | 59 | 236 | 172 | 108 | 44 | 221 | 157 | 93 | 29 | 206 | 142 | 78 | 14 | 191 | 127 | 63 |
| 11 | 188 | 124 | 60 | 237 | 173 | 109 | 45 | 222 | 158 | 94 | 30 | 207 | 143 | 79 | 15 | 192 | 128 | 64 |
| 12 | 189 | 125 | 61 | 238 | 174 | 110 | 46 | 223 | 159 | 95 | 31 | 208 | 144 | 80 | 16 | 193 | 129 | 65 |
| 13 | 190 | 126 | 62 | 239 | 175 | 111 | 47 | 224 | 160 | 96 | 32 | 209 | 145 | 81 | 17 | 194 | 130 | 66 |
| 14 | 191 | 127 | 63 | 240 | 176 | 112 | 48 | 225 | 161 | 97 | 33 | 210 | 146 | 82 | 18 | 195 | 131 | 67 |
| 15 | 192 | 128 | 64 | 241 | 177 | 113 | 49 | 226 | 162 | 98 | 34 | 211 | 147 | 83 | 19 | 196 | 132 | 68 |
| 16 | 193 | 129 | 65 | 1 | | | | | | | | | | | | | | |
| 17 | 194 | 130 | 66 | 2 | | | | | | | | | | | | | | |

FIG. 18

| ADDRESS | HALFTONE DOT AREA RATE OF 50% OUTPUT DATA | | | | | | | |
|---|---|---|---|---|---|---|---|---|
| 1 | 0 | 0 | 0 | 0 | 0 | 0 | 1 | 1 |
| 2 | 0 | 0 | 0 | 0 | 0 | 0 | 1 | 1 |
| 3 | 0 | 0 | 0 | 0 | 0 | 1 | 1 | 1 |
| 4 | 0 | 0 | 0 | 0 | 1 | 1 | 1 | 1 |
| 5 | 0 | 0 | 0 | 0 | 1 | 1 | 1 | 1 |
| 6 | 0 | 0 | 0 | 1 | 1 | 1 | 1 | 1 |
| 7 | 0 | 0 | 0 | 1 | 1 | 1 | 1 | 1 |
| 8 | 0 | 0 | 1 | 1 | 1 | 1 | 1 | 1 |
| 9 | 0 | 0 | 0 | 1 | 1 | 1 | 1 | 1 |
| 10 | 0 | 0 | 0 | 0 | 0 | 0 | 1 | 1 |
| 11 | 0 | 0 | 0 | 0 | 0 | 0 | 0 | 1 |
| 210 | 0 | 0 | 0 | 0 | 0 | 0 | 0 | 0 |
| 211 | 1 | 1 | 0 | 0 | 0 | 0 | 0 | 0 |
| 212 | 1 | 1 | 1 | 1 | 0 | 0 | 0 | 0 |
| 213 | 1 | 1 | 1 | 1 | 1 | 0 | 0 | 0 |
| 214 | 1 | 1 | 1 | 1 | 1 | 1 | 1 | 1 |
| 215 | 1 | 1 | 1 | 1 | 1 | 1 | 1 | 1 |
| 216 | 1 | 1 | 1 | 1 | 1 | 1 | 1 | 1 |
| 217 | 1 | 1 | 1 | 1 | 1 | 1 | 1 | 1 |
| 218 | 1 | 1 | 1 | 1 | 1 | 1 | 1 | 0 |
| 219 | 1 | 1 | 1 | 1 | 1 | 1 | 1 | 0 |
| 220 | 1 | 1 | 1 | 1 | 1 | 1 | 0 | 0 |
| 238 | 0 | 0 | 0 | 0 | 0 | 1 | 1 | 1 |
| 239 | 0 | 0 | 0 | 0 | 0 | 0 | 0 | 1 |
| 240 | 0 | 0 | 0 | 0 | 0 | 0 | 0 | 1 |
| 241 | 0 | 0 | 0 | 0 | 0 | 0 | 1 | 1 |

METHOD FOR PRODUCING A HALFTONE PLATE FOR USE IN A PICTURE REPRODUCING MACHINE

BACKGROUND OF THE INVENTION

The present invention relates to a method for producing a halftone plate having a certain screen angle from an original picture having a continuous tone directly for use in a picture reproducing machine such as a color scanner for plate making and a color facsimile.

In a conventional picture reproducing machine such as a color scanner, a halftone plate is produced from an original picture having a continuous tone by exposing a lithographic recording film via a halftone contact screen overlapped thereon by using a light beam modulated by a picture signal picked up from the original picture by scanning. Alternatively, the original picture and the halftone contact screen are scanned separately in the synchronous relation to obtain output signals and then the output signals are treated electrically to produce a halftone plate having a certain screen angle.

However, in such methods wherein the halftone contact screen is used, there are disadvantages such as high cost, unevenness of halftone dots by a poor contact between the halftone contact screen and the film, a large exposure light source, and an inevitably complicated and large machine.

Other methods wherein the halftone dots are produced electrically, have been developed. For example, in a halftone dot pattern having a screen angle similar to the desired screen angle, the desired halftone dot data to be stored in a memory can be reduced by selecting a screen angle for which a basic halftone structure having the earliest period is produced, as disclosed in Japanese Patent Publication No. 52-49361.

In this method, a screen angle is selected so that its tangent value may be a rational number, and a square halftone dot pattern which is defined by axes extending in the directions of the scanning direction and the moving direction of the head in the rectangular coordinates, is repeated over the basic halftone structures. Hence, a reproduction picture is recorded by using this repeat pattern, and thus the necessary halftone dot data to be stored in the memory can be reduced.

In this embodiment, for example, when a screen angle $\alpha$ is determined so that its tangent value $\tan \alpha$ equals a rational number $y/x$, wherein x and y mean integral multiples of a screen line pitch, one square repeat pattern includes the $x^2+y^2$ number of entire halftone dots. This means that, in the conventional method, even if the screen angle is determined so that its tangent value may be a rational number, the halftone dot data for one square repeat pattern including at least $x^2+y^2$ number of vignette halftone dots is essential for reproducing the original picture.

In this method, however, it is difficult to select a screen angle similar to the desired screen angle, whose tangent value is a rational number, without increasing the necessary halftone dot data. In practice, the screen angle whose tangent value is a rational number so that the desired halftone dot data may be the minimum, i.e. the $x^2+y^2$ number of halftone dots, is preferentially selected.

For instance, when the screen angle of 15 degree, which is often selected for the color separation for plate making, is desired, a rational number $y/x$ similar to the value of tan 15° is ¼, 3/11, 4/15, 5/19, or the like. The vignette halftone dots included in one repeat pattern are so calculated for each rational number: 17 for ¼, 130 for 3/11, 241 for 4/15, 386 for 5/19, or the like.

Meanwhile, the actual screen angle for the rational number ¼, 3/11, 4/15, or 5/19 is 14.036, 15.255, 14.931 or 14.743°, respectively and hence the repeat pattern for the rational number 4/15, the closest approximation to the screen angle of 15° includes 241 vignette halftone dots.

In order to obtain the desired halftone dot data of the repeat pattern including 241 vignette halftone dots continuously and electrically, the corresponding part of a halftone contact screen is scanned as described above, or the desired halftone dot data stored in a memory in advance, which is operable in real time processing, is read out of the memory consecutively. However, the former method requires a complicated large machine as described above, and the latter method involves a memory having a large capacity. Both methods are not practicable.

SUMMARY OF THE INVENTION

It is an object of the present invention to provide a method for producing a halftone plate having a certain screen angle from an original picture having a continuous tone directly for use in a picture reproducing machine such as a color scanner for plate making and a color facsimile, which method is free from the aforementioned disadvantages and inconveniences, and which is capable of any screen angle whose tangent value is a rational number, and greatly reduces the desired halftone dot data to be stored in a memory.

According to the present invention there is provided a method for producing a halftone plate from an original picture having a continuous tone directly, for use in a picture reproducing machine wherein a reproduction picture is recorded on a photosensitive material by means of a plurality of exposure light beams which are independently modulated by picture signals obtained by scanning the original picture, the improvement comprises the steps of (a) dividing a halftone dot area into picture elements depending on a screen angle approximate to the desired screen angle, whose tangent value is a rational number, (b) addressing numbers to the picture elements of the halftone dot area divided in, a predetermined order, (c) storing data for halftone dot area rates and forms of halftone dot patterns into addresses of memories which are addressed by a common address number, (d) selecting one of the memories depending on the picture signals obtained by the original picture scanning, (e) reading the same data out of the selected memory in parallel, and (f) controlling the exposure light beams according to the read-out data, thereby producing a halftone plate.

BRIEF DESCRIPTION OF DRAWINGS

In order that the present invention may be better understood, preferred embodiments thereof will be described with reference to the accompanying drawings, in which:

FIG. 11 shows one quantized halftone dot area of FIG. 7 together with its picture element addresses;

FIG. 18 shows a memory map of a memory for recording the halftone dot pattern of FIG. 17;

DESCRIPTION OF THE PREFERRED EMBODIMENTS

Figure 1:
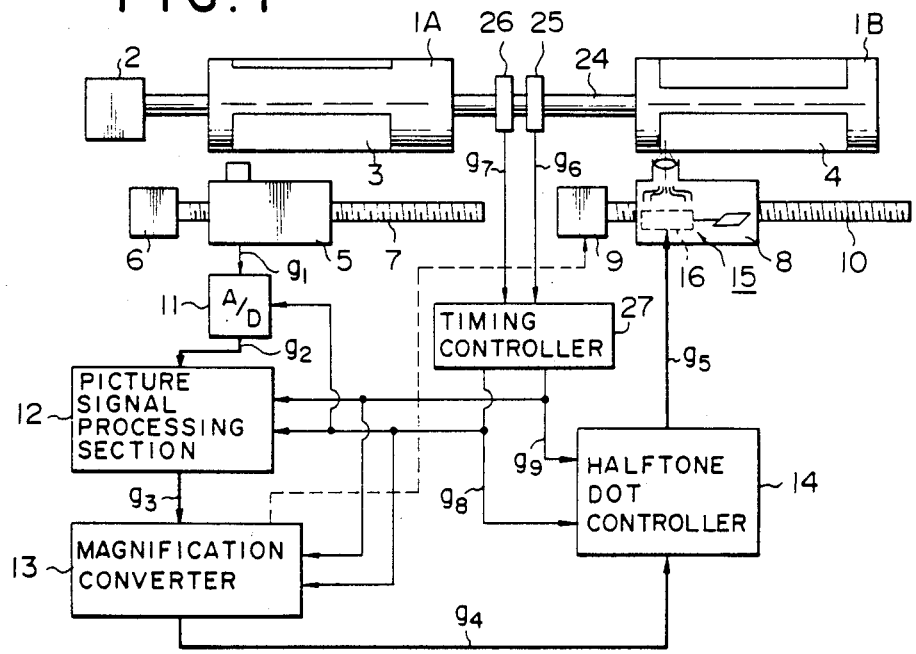
FIG. 1 is a block diagram of a picture reproducing machine which carries out a method according to the present invention.

Referring now to the drawings there is shown in FIG. 1 a picture reproducing machine such as a color scanner which carries out a method according to the present invention.

A picture cylinder 1A and a recording cylinder 1B are rotated in common by a motor 2. An original picture 3 and a photosensitive material 4 are mounted to the picture cylinder 1A and the recording cylinder 1B, respectively.

The original picture 3 is photoelectrically scanned by a pickup head 5 which is moved in the direction of the cylinder's axis on and along a screw rod 7 by a motor 6, while the picture cylinder 1A is rotated, to obtain a picture signal $g_1$. The photosensitive material 4 is scanned by an exposure head 8 which is moved in the direction of the cylinder's axis on and along a screw rod 10 by a motor 9, while the recording cylinder 1B is rotated, to record a reproduction picture on the photosensitive material 4.

The analog picture signal $g_1$ picked up by the pickup head 5 is sent to an analog-digital converter 11, hereinafter referred to as an A/D converter, and is converted there into a digital picture signal $g_2$.

The digital picture signal $g_2$ is fed to a picture signal processing section or means 12 wherein necessary processings such as a color correction, a tone control, and so forth, are applied to the digital picture signal $g_2$ to output a corrected digital picture signal $g_3$ which is sent to a magnification converter 13 as occasion demands.

The magnification converter 13 of a conventional type, skips or repeatedly outputs the input data depending on a reproduction scale with respect to the time axis, and outputs a magnification converted digital picture signal $g_4$ to a halftone dot controller 14. When the reproduction scale is not changed, the corrected digital picture signal $g_3$ is sent to the halftone dot controller 14 without any change, accordingly.

The halftone dot controller 14 outputs an exposure light control signal $g_5$ for recording a halftone dot pattern having a halftone dot area rate corresponding to the density of the input digital picture signal $g_4$ depending on the density of the digital picture signal $g_4$. The exposure light control signal $g_5$ is input to a light path open-close control means 16 of an exposure light source means 15 included in the exposure head 8, and controls to open or close light paths $17_1$-$17_8$ of the exposure light source means 15.

Figure 2:
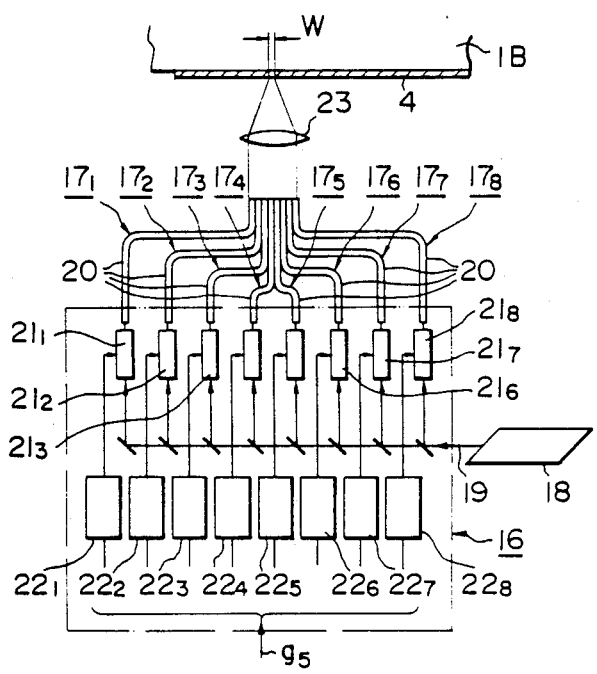
FIG. 2 is a block diagram of one embodiment of an exposure light source of FIG. 1.

In FIG. 2 there is shown one embodiment of the light path open-close control means 16 of the exposure light source means 15, comprising optical fibers 20 constituting the light paths $17_1$-$17_8$, light beam open-close control means $21_1$-$21_8$ through which a light beam 19 generated by a laser light beam generator 18 is passed, and drive circuits $22_1$-$22_8$ which control the light beam open-close control means $21_1$-$21_8$ so as to open or close the light paths $17_1$-$17_8$ by means of the exposure light control signal $g_5$ having two values such as "H" and "L", or "1" and "0" of logic levels.

The light beam output ends of the optical fibers 20 are aligned in series in the direction of the cylinder's axis, and the light beams output from the light beam output ends of the optical fibers 20 in parallel are focused onto the photosensitive material 4 by a lens 23. The width W of the focused light beams is adapted to be the same as a moving pitch P of the exposure head 8 per one rotation of the recording cylinder 1B.

Each focused light beam is independently controlled through the light path, and produces an exposure scanning line onto the photosensitive material 4. Hence, the light beams aligned in parallel produce the scanning lines in a spiral form on the periphery of the recording cylinder 1B.

Although eight light paths are shown in the embodiment of FIG. 2, the number of the light paths is not restricted to eight, and any number can be possible.

On a common rotary shaft 24 of the picture and the recording cylinders 1A and 1B, a one rotation pulse generator 25 and a rotation phase pulse generator 26 are disposed, and output a one rotation pulse $g_6$ and a plurality of phase pulses $g_7$ to a timing controller 27, respectively, for every rotation of the cylinders.

The timing controller 27 outputs a clock pulse $g_8$ in synchronization with the two input pulses $g_6$ and $g_7$, by which the analog picture signal $g_1$ is sampled with the desired resolving power in synchronization with the angular speed ( rotation speed and rotation phase ) of the two cylinders 1A and 1B, and by which the exposure scanning line is divided into the same pitch of the period as the scanning line pitch p in the scanning direction, as hereinafter described.

Further, the timing controller 27 prepares and outputs a start pulse $g_9$ on the basis of the one rotation pulse $g_6$, or the one rotation pulse $g_6$ and the phase pulse $g_7$, by which the scanning start point is exactly positioned every rotation of the cylinders 1A and 1B. This start pulse $g_9$ possesses at least the same positioning accuracy as that of the clock pulse $g_8$.

Figure 3:
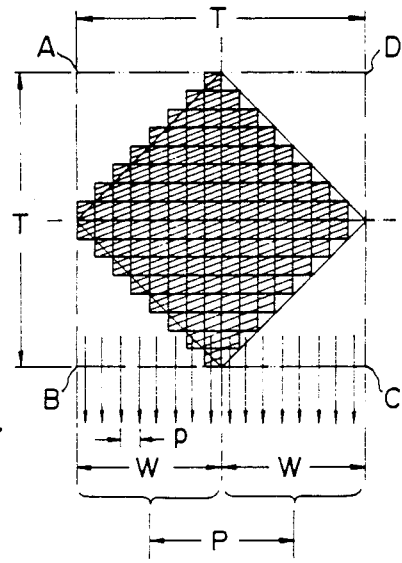
FIG. 3 shows one embodiment of a halftone dot pattern to be produced by the machine of FIG. 1.

In FIG. 3 there is shown one typical embodiment of a halftone dot pattern having a halftone dot area rate of 50% and a screen angle of zero degree of the earliest period which is to be repeated in the scanning direction, which is formed in one square halftone dot area ABCD corresponding to the halftone dot area rate of 100% and one vignette halftone dot of the halftone contact screen. The halftone dot area rate corresponds to the density of the picture signal.

In this embodiment, the four vertices A, B, C and D are the peculiar points, that is, each of the vertices A, B, C and D is included in four adjacent halftone dot areas, in common, while each segment $\overline{AB}$ $\overline{BC}$, $\overline{CD}$ or $\overline{DA}$ except the vertices A, B, C and D, is included in two adjacent halftone dot areas, in common. Further, each vertex A, B, C or D can be referred to as a white dot center or a converging center of white dot patterns of various halftone dot area rates, included in four adjacent halftone dot areas, in a general contact screen, while the center of the halftone dot area or the halftone dot patterns can be a black dot center.

The length of one segment of the halftone dot area ABCD corresponding to its screen pitch T represents a size of one vignette halftone dot of the contact screen. In one halftone dot area, as shown in FIG. 3, the screen pitch T is so determined as to be twice as long as the moving pitch P of the exposure head 8, and thus the halftone dot pattern is recorded by two scannings by means of the focused light beams having the width W generated by the exposure light source means 15. In FIG. 3 arrows show the scanning direction of the scanning line or the light paths $17_1$–$17_8$, and p means the scanning line pitch as described above.

Figure 4:
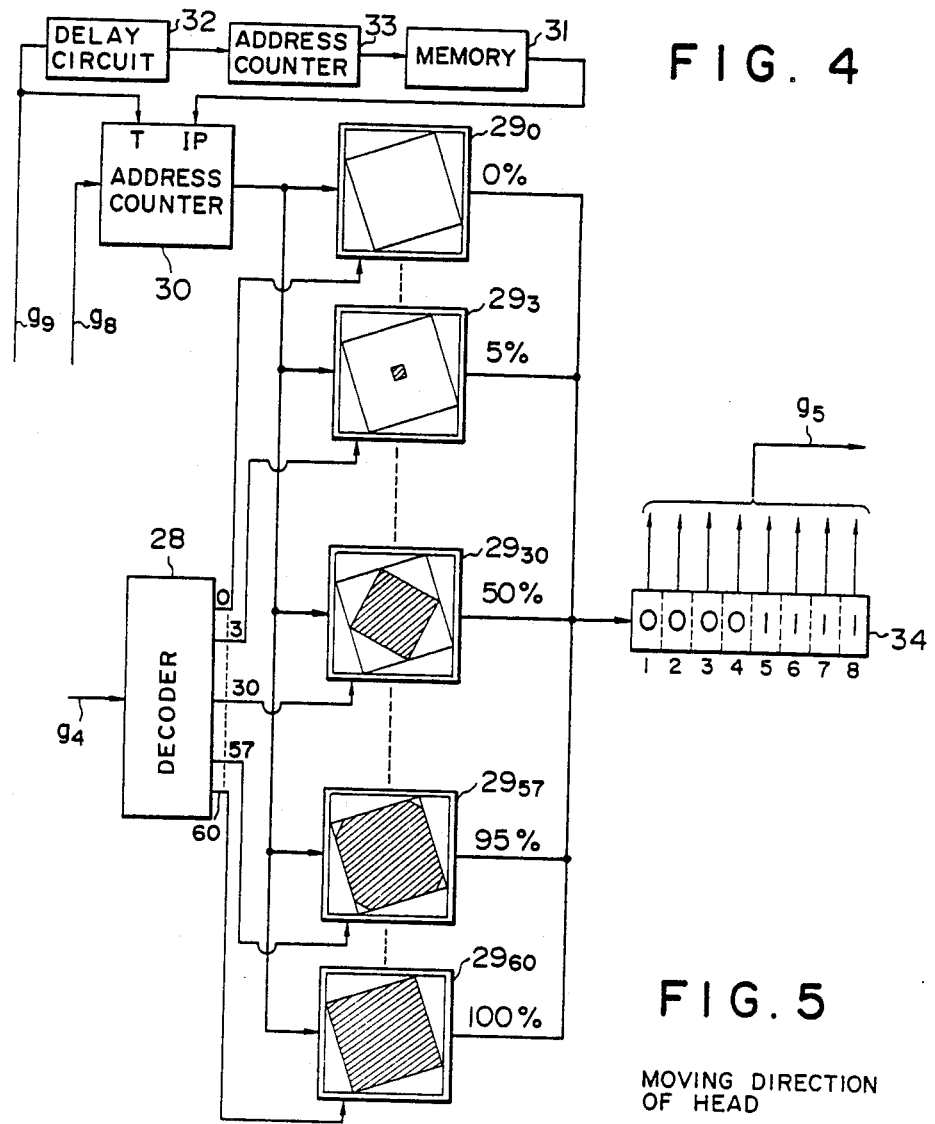
FIG. 4 is a block diagram of one embodiment of a halftone dot controller of FIG. 1.

In FIG. 4 there is shown one embodiment of the halftone dot controller 14 shown in FIG. 1. The digital picture signal $g_4$ is input to a decoder 28 which selects one of memories $29_0$–$29_{60}$ depending on the density of the digital picture signal $g_4$. That is, the decoder 28 possesses output lines corresponding to the memories $29_0$–$29_{60}$ wherein different halftone dot patterns of 0%–100% varied stepwise are stored in advance. Hence, when the decoder 28 selects one output line depending on the density of the digitial picture signal $g_4$ input, the output signal of the selected output line enables the corresponding memory having the halftone dot of the halftone dot area rate corresponding to the density of the digital picture signal $g_4$, to the read-out mode. The memories $29_0$–$29_{60}$ are addressed in common by an address signal output from an address counter 30.

The address counter 30 circulates the address number from "1" to "241" consecutively by the clock pulse $g_8$ which is input thereto. The start pulse $g_9$ is fed to a delay circuit 32, and then the delay circuit 32 delays the start pulse $g_9$ and sends the delayed start pulse to a base 241 address counter 33. Then, the address counter 33 circulates the addresses of a memory 31 continuously from "1" to "241", which reads out an initial preset value for determining the initial address number of the start point of each scanning line, stored in the memory 31, in advance.

The initial preset value is sent to an initial preset terminal IP of the address counter 30, and is preset therein by the start pulse $g_9$ which is input to a timing terminal T of the address counter 30.

The data read out of the memories $29_0$–$29_{60}$ by the address signal of the address counter 30 is sent to a register 34 having eight figures corresponding to eight bits of the data via a common bus. The register 34 outputs a binary coded data of eight bits in parallel as the exposure light control signal $g_5$ to the light path open-close control means 16.

Each of eight bits of the register 34 corresponds to each of the exposure light paths $17_1$–$17_8$ in the numerical order. Therefore, the first light path $17_1$ and the eighth light path $17_8$, which are numbered from the left hand side, correspond to the uppermost bit and the lowermost bit of the register 34, respectively.

In the set of memories $29_0$–$29_{60}$, a set of halftone dot patterns having different halftone dot area rates which are varied into 61 steps in a range of 0%–100% with respect to a certain screen angle, are stored. The halftone dot area is quantized or divided into picture elements, as hereinafter described in details, and accordingly the halftone dot patterns are composed of the picture elements.

The address numbers are so attached to the picture elements quantized of the halftone dot area having a certain screen angle, as hereinafter described in details in connection with FIGS. 5-11, that the arrangement of the address numbers of the picture elements of every halftone dot area may be the same, that the address numbers of the picture elements of each scanning line may circulate in the numerical order in the scanning direction, and that the address numbers of the picture elements aligned in the moving direction of the head may circulate in the fixed order.

The eight light beams of the eight light paths $17_1$–$17_8$ aligned in parallel in the moving direction of the head produce eight picture elements aligned in the moving direction with address numbers. One of the address numbers of the eight picture elements can be used as a representative address.

When the address number on the scanning line corresponding to the first light path $17_1$ is selected to the representative address and the address counter 30 outputs the representative address signal to the memories $29_0$–$29_{60}$ in common, the enabled one of the memories $29_0$–$29_{60}$ outputs an eight bit binary coded data representing eight picture elements of a halftone dot pattern to be obtained, to the register 34, as described above.

Each of the quantized picture elements is attached by not only an address number but also a binary code such as "0" or "1" for determining a shape of a halftone dot pattern. The binary code "0" or "1" is selected depending on the halftone dot area rate of the halftone dot pattern.

Therefore, assuming that the black or exposure part and the white or non-exposure part are represented by "1" and "0", the halftone dot area rate of the halftone dot pattern is expressed by the percentage of the picture elements having "1" with respect to the total picture elements.

Accordingly, the kind of the halftone dot patterns or the step number of the halftone dot area rates can be the same number as the total picture elements. In the embodiment shown in FIG. 4, 61 different halftone patterns of 61 different halftone dot area rates varied stepwise into 61 steps of 0–60 are stored in the memories $29_0$–$29_{60}$.

The shape of each halftone dot pattern is determined by the arrangement of the picture elements having the code "1" and the number thereof, and accordingly the shape of each halftone dot pattern does not correspond unconditionally to each halftone dot area rate.

The halftone dot patterns are stored in the memories $29_0$–$29_{60}$ with their shapes, as schematically shown in the blocks of the memories $29_0$–$29_{60}$ in FIG. 4.

In the memories $29_0$–$29_{60}$, the addresses correspond to the addresses of the first light path of the eight bit sets of picture elements, and the stored data for each address is composed of eight bit binary codes which are attached to the set of eight picture elements (refer to FIG. 18). The methods for determining the shapes and the addresses of the halftone dot patterns, and a format of the pattern data stored in the memory will be hereinafter described with reference to the drawings.

The address numbers of the picture elements of the quantized halftone dot areas, which are aligned on and along the scanning start line in the direction of the moving direction of the head, are read out every eight addresses and are stored in the memory 31 as the initial preset values.

Then, the methods for quantizing the repeat halftone dot pattern having a screen angle into the picture elements and addressing the numbers to the quantized picture elements will be described.

Figure 5:
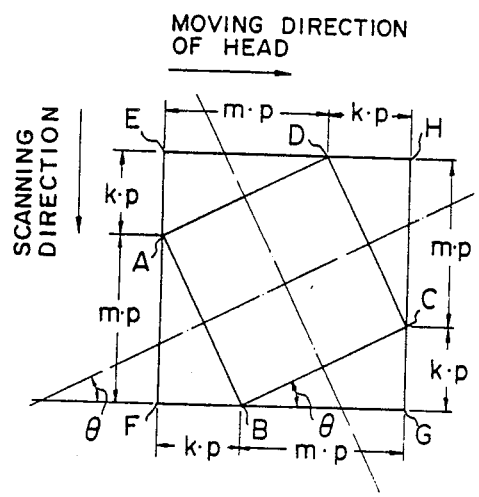
FIG. 5 shows a halftone dot area having a screen angle whose tangent value is expressed by a rational number.

In FIG. 5 there is shown one square halftone dot area ABCD having a certain screen angle $\theta$, which is inscribed to a circumscription square EFGH whose sides extend in the directions of the scanning and the moving of the head.

The length of each side EF, FG, GH or HE is determined so as to be an integral multiple of the scanning line pitch p, and is divided into two segments having lengths m.p and k.p, m and k being integral numbers, by the vertex A, B, C or D of the square halftone dot area ABCD. In this case, therefore, the screen angle $\theta$ whose tangent value $\tan \theta$ equals k/m, is determined.

Figure 6:
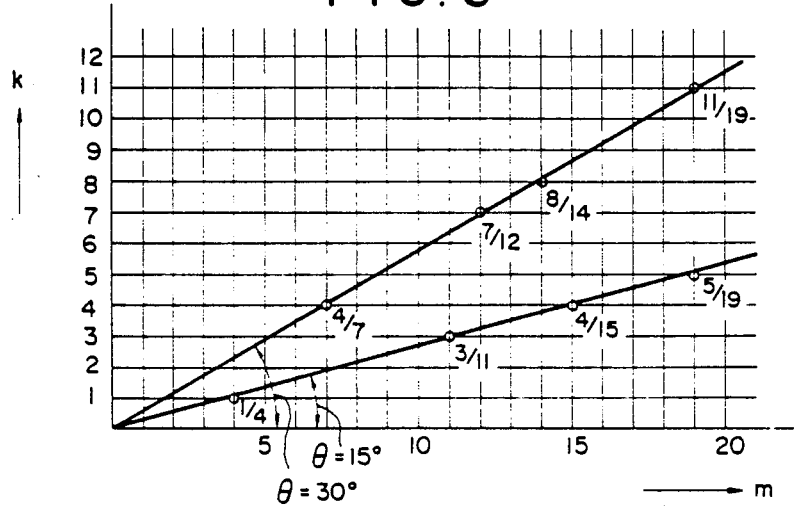
FIG. 6 is a graph showing lines for graphically obtaining the most approximate rational number of the tangent of the desired screen angle.

In FIG. 6 there are shown lines for graphically obtainining the integral numbers k and m of the tangent value k/m of the most approximate screen angle to the desired screen angle.

For example, a line having the desired screen angle such as 15 or 30 degree is drawn from the origin of a rectangular coordinates wherein the integral numbers k and m are scaled in the vertical and the horizontal directions, and the coordinates of an intersect of the above screen angle line and an intersect of the two scale lines of the integral numbers k and m or the coordinates of the substantial intersect thereof are selected as the desired integral numbers k and m.

The tangent value of the screen angle of the screen angle line passing through the selected coordinates of the intersect is expressed by a rational number. For instance, the tangent value k/m of an angle similar to the screen angle of 15 degree is $\frac{1}{4}$, 3/15, 4/15, 5/19, or the like, and the value k/m of an angle similar to the screen angle of 30 degree is 4/7, 7/12, 8/14, 11/19, or the like. When the screen angle is 15 degree, k/m —4/15 for the most approximate angle 14.931 degree is obtained. Hence, the preferred embodiments of the present invention are described in connection with this value.

Figure 7:
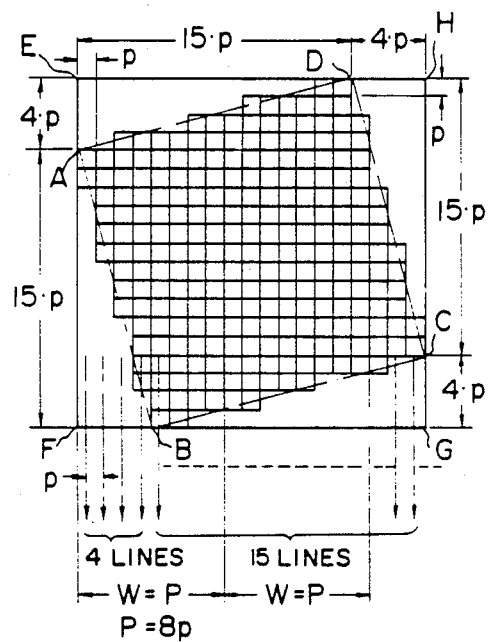
FIG. 7 shows a halftone dot area quantized having a screen angle whose tangent is 4/15.

In FIG. 7 there is shown one embodiment of a quantized halftone dot area having a screen angle whose tangent value is 4/15. In this embodiment, therefore, the square EFGH circumscribing the halftone dot area (the square ABCD) is divided into k+m=19 by the scanning line pitch p in the scanning direction and the moving direction of the head. The dividing lines of the circumscription square EFGH also divide the halftone dot area inscribing the square EFGH into the square picture elements as the minimum quantized units having a side of the scanning line pitch p.

Thus the obtained halftone dot area quantized possesses a mosaic pattern composed of the picture elements, whose periphery extends in an endless segmental line form along the sides of the square ABCD. The halftone dot area hereinafter mentioned means usually this quantized mosaic halftone dot area. The reproduction picture is recorded by this halftone dot patterns aligned repeatedly without any omission on the photosensitive material. In other words, each halftone dot area connects tightly and exactly to the adjacent halftone dot areas, i.e. every halftone dot area can be perfectly overlapped onto the others one on another by moving it in parallel.

Figure 8:
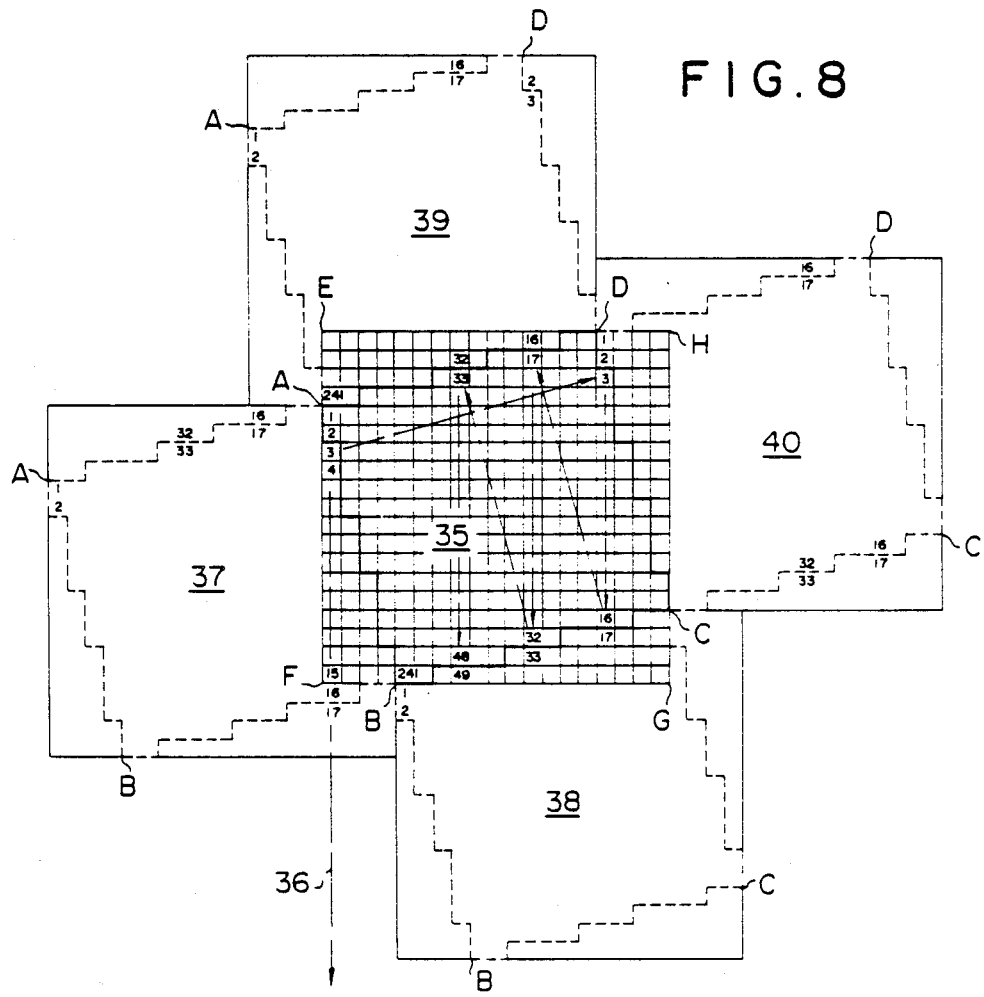
FIG. 8 shows a quantized halftone dot area, alike FIG. 7, together with four adjacent halftone dot areas which are continuously connected thereto.

In FIG. 8 there are shown one halftone dot area 35 and four adjacent halftone dot areas 37–40 which are continuously connected to the upper, the lower, the right and the left sides thereof by owning in common the sides of the picture elements along the borders of the halftone dot areas so that the picture elements may be aligned in the scanning direction and the moving direction of the head. In this embodiment, the picture elements are the minimum quantized units, as described above.

Therefore, the picture elements aligned on each scanning line in the scanning direction can be attached by the addresses in the numerical order so as to be addressed by clock pulses at a certain pitch in the scanning direction. The scanning direction and the moving direction of the head may be hereinafter referred to as a column direction (up to down in the drawings) and a row direction (left hand side to right hand side in the drawings).

That is, in the central halftone dot area 35, if the picture element including a point A is numbered to the address "1", the addresses of the picture elements aligned in the scanning direction or the column direction 36 can be automatically determined in the numerical order.

Meanwhile, since the arrangement of the picture elements of the repeat halftone dot area is determined in the fixed relation and the halftone picture is reproduced by repeatedly recording the halftone dot areas, all picture elements of the halftone dot area correspond perfectly to those of the other halftone dot areas.

Accordingly, a certain number of the picture elements aligned along the scanning line passing through the halftone dot areas of the halftone construction correspond to the addresses attached to all the picture elements of one halftone dot area.

For example, the address 3 of the halftone dot area 37 corresponds to the address 3 of the halftone dot area 35, and the following addresses 4-16 correspond in the same manner as above. Further, the address 16 transferred to the corresponding position of the halftone dot area 35 continues to the address 17 of the halftone dot area 38. The address 17 of the halftone dot area 38 corresponds to the address 17 of the halftone dot area, which continues to the address 16 of the halftone dot area 37 in the column direction. The address 17 of the halftone dot area 35 is continued from the address 16 of the halftone dot area 39, as clearly shown in FIG. 8.

In the same manner as described above, the address numbers of the picture elements of the halftone dot area 35 are determined. That is, first, the address number 1 is attached to a certain picture element, and then the following address numbers are determined to the picture elements followed after the certain initial picture element in the column direction. When the address order is reached the border picture element of the halftone dot area 35, the address order then continues to the picture element corresponding to another border picture element of the adjacent halftone dot area to the halftone dot area 35, the another border picture element being followed after the border picture element of the halftone dot area 35. Then, the address numbers are determined to the picture elements aligned in the column direction after the picture element corresponding to the another border picture element, in the numerical order. Next, when the address order is come to the border picture element of the halftone dot area 35, the address order goes on the picture element corresponding to still another border picture element of the adjacent halftone dot area to the halftone dot area 35, the still another border picture element being followed after the border picture element of the halftone dot area 35. Then, the address numbers of the rest of the picture elements of the halftone dot area 35 are determined in the same manner as described above, thereby determining the address numbers of all the picture elements of the halftone dot area 35.

Consequently, the address numbers are determined to all the picture elements of the halftone dot areas 37-40 in the same manner as the halftone dot areas 35 described above, since every halftone dot area is equivalent or has the same properties and nature, as described above.

Figure 9:
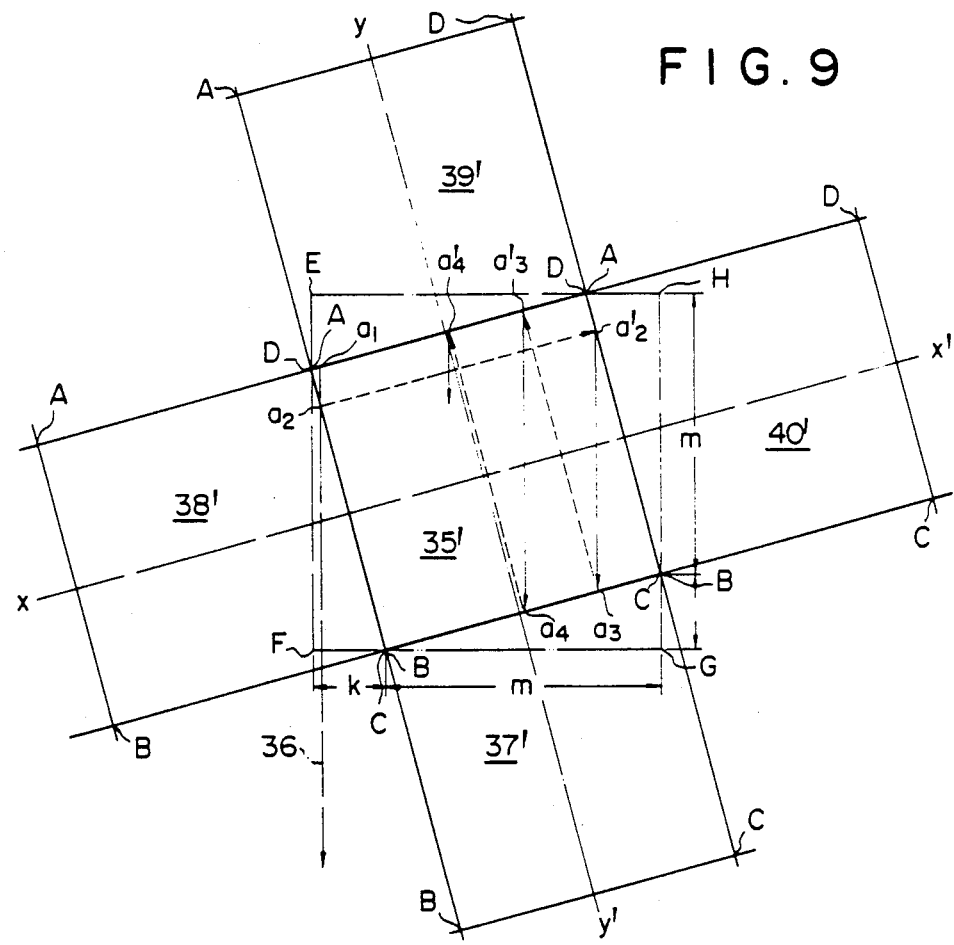
FIG. 9 shows halftone dot areas, alike FIG. 8, which are not quantized.

In FIG. 9 there are shown five halftone dot areas, alike FIG. 8, which are not quantized, for the explanation of the priciple for determining the address numbers of the picture elements of the halftone dot area.

In FIG. 9, the halftone dot area 35' shown by a solid line is continuously connected to the four adjacent halftone dot areas 37', 38', 39' and 40' by holding in common the segments $\overline{AB}$, $\overline{BC}$, $\overline{DC}$ and $\overline{AD}$ of the peripheral lines of the halftone dot area 35'.

Each adjacent halftone dot area 37', 38', 39' or 40' can be formed by moving the central halftone dot 35' in parallel with a line x-x' or y-y'. Accordingly, the segments $\overline{AB}$ and $\overline{DC}$ or $\overline{AD}$ and $\overline{BC}$ of the halftone dot areas correspond to each other with respect to the parallel movements of the halftone dot areas.

Now, a line is drawn from a point $a_1$ positioned on the segment $\overline{DA}$ of the halftone dot area 35' in the direction of the scanning line 36, and intersects the segment $\overline{AB}$ at a point $a_2$. The intersect $a_2$ is transferred in parallel onto the segment $\overline{CD}$, thereby obtaining a corresponding point $a_2'$ on the segment $\overline{CD}$.

Then, a line is drawn from the point $a_2'$ in the scanning direction, and intersects the segment $\overline{BC}$ at a point $a_3$ thereon. Next, the point $a_3$ is transferred in parallel onto the segment $\overline{DA}$, thereby obtaining a corresponding point $a_3'$ thereon, in the same manner as described above. Then, a line is drawn from the point $a_3'$ in the scanning direction and an intersect $a_4$ is obtained on the segment $\overline{BC}$ in the same manner as above. The point $a_4$ is transferred onto the segment $\overline{DA}$ at a corresponding point $a_4'$ in the same manner as described above. Then, lines are drawn consecutively from points positioned on the segments $\overline{DA}$ and $\overline{CD}$ to intersects positioned on the segments $\overline{AB}$ and $\overline{BC}$ in the same manner as described above, in the halftone dot area 35, until a corresponding point on the segment $\overline{DA}$ is returned or overlapped to the initial point $a_1$.

Figure 10:
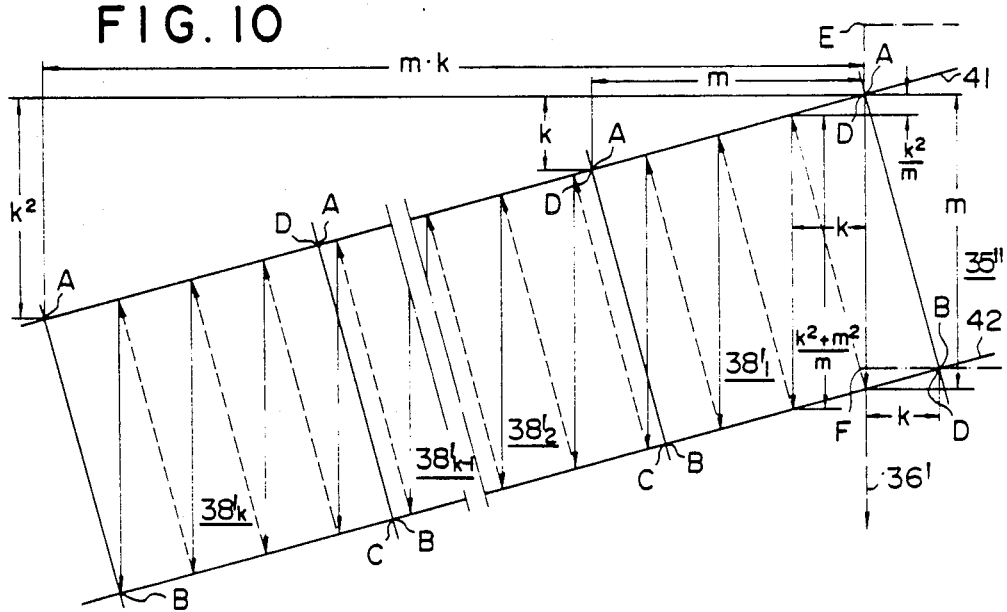
FIG. 10 shows halftone dot areas aligned in series wherein a transfer of corresponding points of picture elements shown in FIG. 9 is shown by arrows.

FIG. 10 shows a path the scanning line 36' is consecutively passed from the point A of the halftone dot area 35" to another point A of a halftone dot area $38_k'$ via halftone dot areas $38_1'$-$38_{k-1}'$ which are aligned in series by holding their segments $\overline{AB}$ or $\overline{CD}$ in common, by moving the corresponding points in parallel in the same manner as the embodiment of FIG. 9.

In this embodiment, two lines 41 and 42 which pass the vertices A and D and the vertices B and C, respectively, of the halftone dot areas $38_1'$-$38_k'$ aligned from the halftone dot area 35" in series in the x direction, are positioned in parallel with each other, and correspond to each other in the direction of the line y-y'. That is, the two parallel lines 41 and 42 have the corresponding points in the direction of the line y-y' perpendicular to the two lines 41 and 42.

Now, the scanning line 36' passing through the vertex A of the halftone dot area 35" goes on through the halftone dot areas $38_1'$-$38_k'$ via the corresponding points, as shown by solid lines connected by broken lines in FIG. 10, these solid lines being equivalent to the scanning line 36' and thus hereinafter referred to as the scanning line 36'.

Hence, the scanning line 36' started from the point A of the halftone dot area 35" goes on between the lines 41 and 42, i.e. whenever the scanning line 36' intersects the line 42, the intersect is transferred to its corresponding point on the line 41, to reach the corresponding point A of the halftone dot area $38_k'$.

In order that the scanning line 36' started from the point A of the halftone dot area 35" may pass through the corresponding point A of the halftone dot area $38_k'$, the screen angle is so determined that its tangent value may be a rational number k/m, as described above. When this condition is satisfied, the scanning line 36' moves the distance of $k^2+m^2$ from the starting point A up to the corresponding point A or B of the halftone dot area $38_k'$, as shown in FIG. 10.

In this embodiment, as shown in FIGS. 7 and 8, the halftone dot area is quantized by the unit distance or the scanning line pitch p multiplied to the integral numbers m and k, in the scanning direction and the moving direction of the head. Therefore, the movement of the distance $k^2+m^2$ of the scanning line 36' means the count of the $k^2+m^2$ times of the scanning line pitch p. In other words, the $k^2+m^2$ number of the picture elements are aligned in the distance between the starting point A of the halftone dot area 35" and the corresponding point A or B of the halftone dot area $38_k'$ the scanning line 36' moves on.

FIGS. 9 and 10 show the same principle with respect to the different figures, and accordingly on the line drawn from the point $a_l$ in the scanning direction 36 back to the point $a_l$ again in the halftone dot area 35' of FIG. 9, there are the $k^2+m^2$ number of the picture elements aligned. Since the total number S of the picture elements of the halftone dot area quantized equals $k^2+m^2$, as shown in FIG. 8, the address numbers are attached to all the picture elements of the halftone dot area.

However, when k/m has a measure N, k/m can be expressed as $k_1\times N/m_1\times N$, and thus according to the irreducible fraction $k_1/m_1$ the distance from the starting point to the corresponding point is calculated to $k_1^2+m_1^2$. In this case, when the address numbers are numbered to all the picture elements of the halftone dot area, the picture elements are divided into groups of the measure N, and each group of picture elements are addressed independently, that is, the start points and the moving paths are different, as hereinafter described in details.

In FIG. 11 there is shown one quantized halftone dot area ABCD wherein m and k are 15 and 4, respectively, as shown in FIG. 7, together with the square EFGH circumscribing the square ABCD for showing the relation between the address numbers and the adjacent halftone dot areas, and some picture elements around the vertices A, B, C and D. In this embodiment, the address numbers are attached to the picture elements by starting from the picture element including the point A with the address number "1".

In this case, the picture elements having the same address number correspond one another, and the halftone dot area surrounded by the thick line includes the picture elements having different address numbers. Accordingly, all the picture elements of one quantized halftone dot area can be addressed by the addresses attached. Hence, the address numbers can be used for looking up the positions of the picture elements in the halftone dot area.

From the quantized halftone dot area together with the address numbers attached to the picture elements shown in FIG. 11, the arrangement of the address numbers of the picture elements of the halftone dot structure which is composed of the halftone dot areas quantized. The address number increases one by one in the column direction or the scanning direction of the picture elements. Then, when the address number is reached to the maximum "241", the address number is returned to "1". In the row direction or the moving direction of the head, the address numbers are arranged in a certain progression of differences.

Then, a method for producing halftone dot patterns having different halftone dot area rates by using the address numbers described above, will be described.

Figure 12:
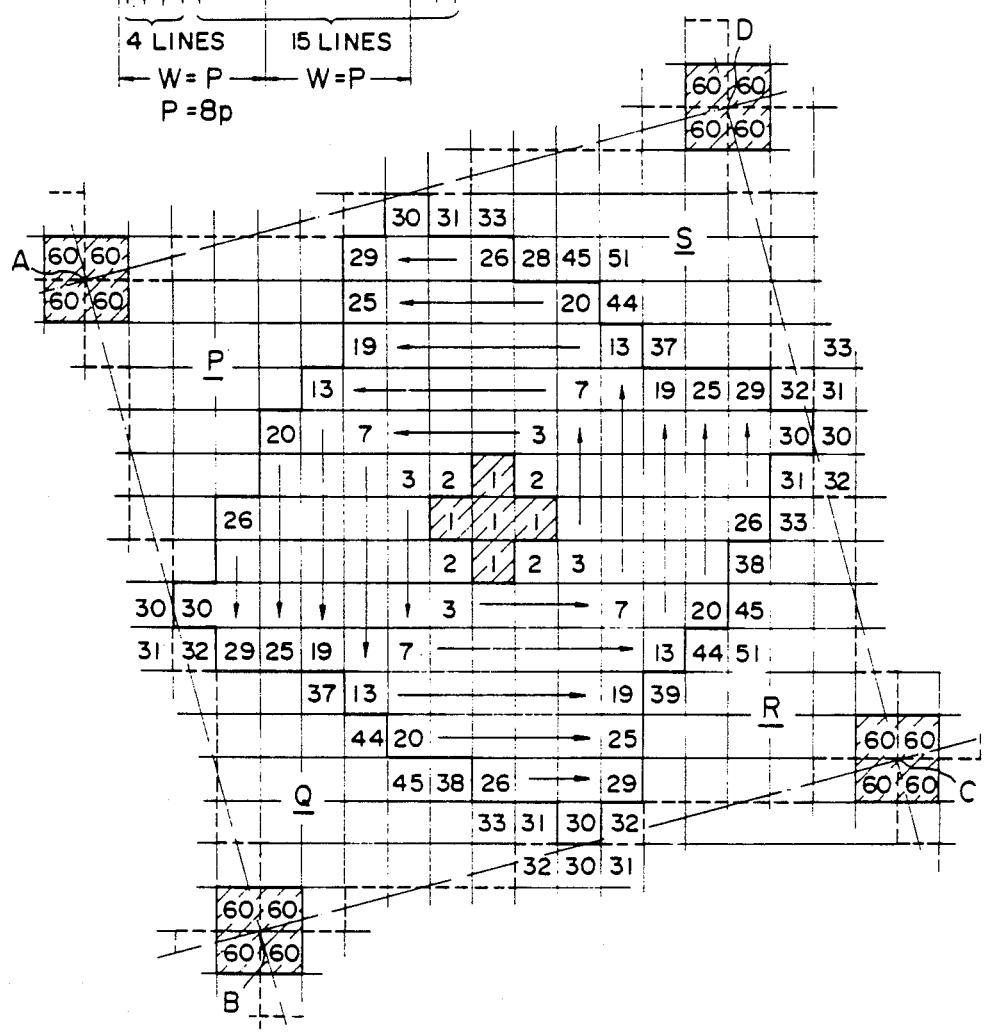
FIG. 12 shows one quantized halftone dot pattern having a halftone dot area rate of 50%, formed in a halftone dot area, together with step numbers dependent on halftone dot area rates.

In FIG. 12, there is shown one quantized halftone dot pattern having a halftone dot area rate of 50%, formed in the halftone dot area shown by broken lines, together with step numbers dependent on halftone dot area rates.

In the halftone dot area, the code "1" or "0" is attached to each picture element, and the halftone dot area rate is determined by the percentage of the picture elements having one of the codes "1" and "0" with respect to the total picture elements.

Therefore, theoretically, the halftone dot area rates and the halftone dot patterns can be expressed independently. However, in order to that the present invention may be readily understood, the explanation will be done with reference to halftone dot pattern forms approximate to conventional halftone dot pattern forms.

The total number $S=k^2+m^2$ of the picture elements of the halftone dot area is 241, when m and k are 15 and 4, respectively, as shown in FIGS. 7, 8 and 11, and hence 241 kinds of halftone dot patterns of different halftone dot area rates can be produced. The number and the shapes of the halftone dot patterns may be determined, as occasion demands, within 241, and further the shapes of the black dot pattern or the halftone dot pattern, and the white dot pattern can be made symmetrically.

FIG. 12 shows the growing process of the black dot patterns stepwise up to the halftone dot area rate of 50% around the black dot center in the halftone dot area. In order to make the halftone dot patterns of symmetrical form, four picture elements positioned in the symmetrical positions are added to the black dot pattern every one step of the increase of the halftone dot area rate.

Now, when 241 picture elements are subtracted four picture elements every one step, one picture element remains after 60 steps of subtractions. If this remaining one picture element is used for one step, 61 steps are necessary for 241 picture elements. Alternatively, the remaining one picture element is added to the first step, and thus the steps required becomes 60 for 241 picture elements. But, there is no substantial difference in these two cases. In FIG. 12 the latter case is shown, and the halftone dot area rate is varied in 60 steps. For the convenience of the explanation, five picture elements arranged around the black dot center are shown for the first step in FIG. 12, but, in practice, one step for the halftone dot area rate of 0% is added.

In FIG. 12 the numbers attached to the picture elements correspond to the steps of the halftone dot area rates of the halftone dot patterns, and correspond also to the sizes of the halftone dot patterns. A plurality of arrows between the numbers in the halftone dot area indicate the increasing directions of the numbers skipped instead of the numbering.

After the halftone dot area rate of the halftone dot area is reached to 50%, it is convenient to think of a white dot pattern which converges on the white dot center while the halftone dot area rate increases to 100%, on a black background, and to address the step numbers to the picture elements of the white dot pattern around the white dot center.

Figure 13:
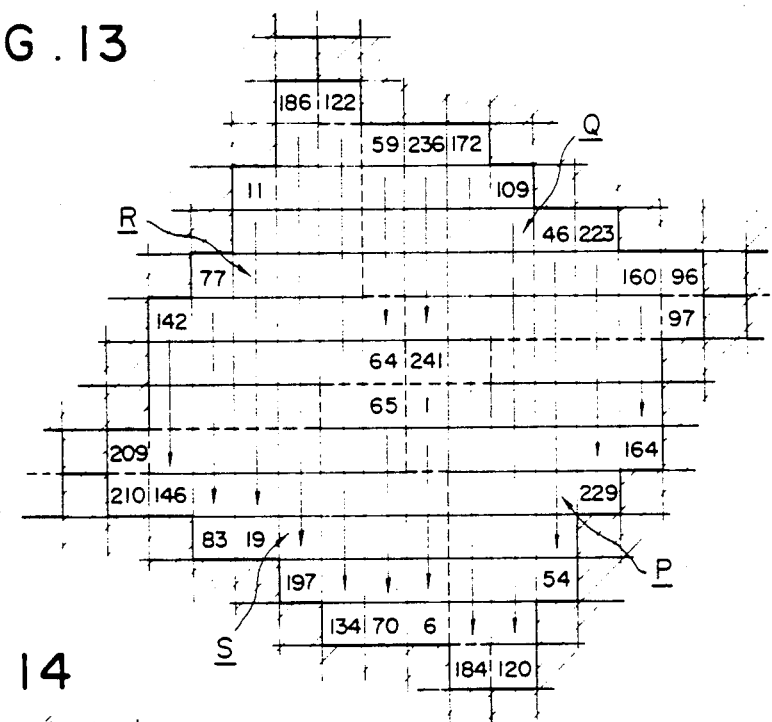
FIG. 13 shows a quantized white dot pattern having a halftone dot area rate of 50%, formed around a white dot center A of adjacent four halftone dot areas of FIG. 11.
Figure 14:
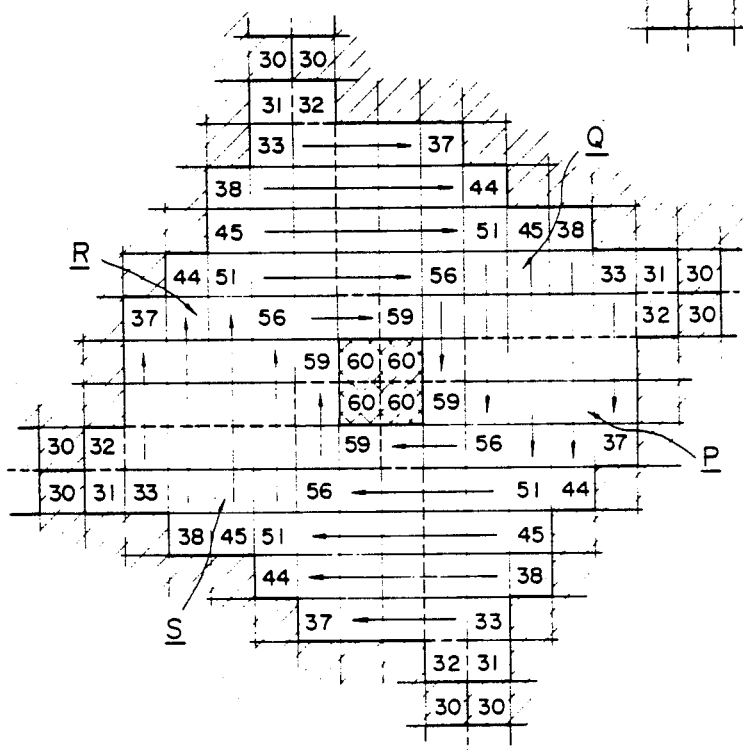
FIG. 14 shows a quantized white dot pattern of FIG. 13, together with step numbers.

The corner areas P, Q, R and S near the vertices or the white dot centers A, B, C and D of the halftone dot area of FIG. 12 are gathered as the white dot pattern around the white dot center and are shown in FIGS. 13 and 14 when the halftone dot area rate is more than 50%. FIG. 13 shows the address numbers attached to the picture elements of the white dot pattern, and FIG. 14 shows the arrangement of the step numbers attached to the picture elements of the same, when the halftone dot area rate is more than 50%.

In FIG. 14 the step number 60 is attached to the central four picture elements around the white dot center, and then the step number reduced one by one is attached to every four picture elements positioned in the symmetrical positions with respect to the white dot center so that the white dot pattern may be enlarged stepwise in a symmetrical form. In this case, the arrows direct in the numerical order.

Figure 22:
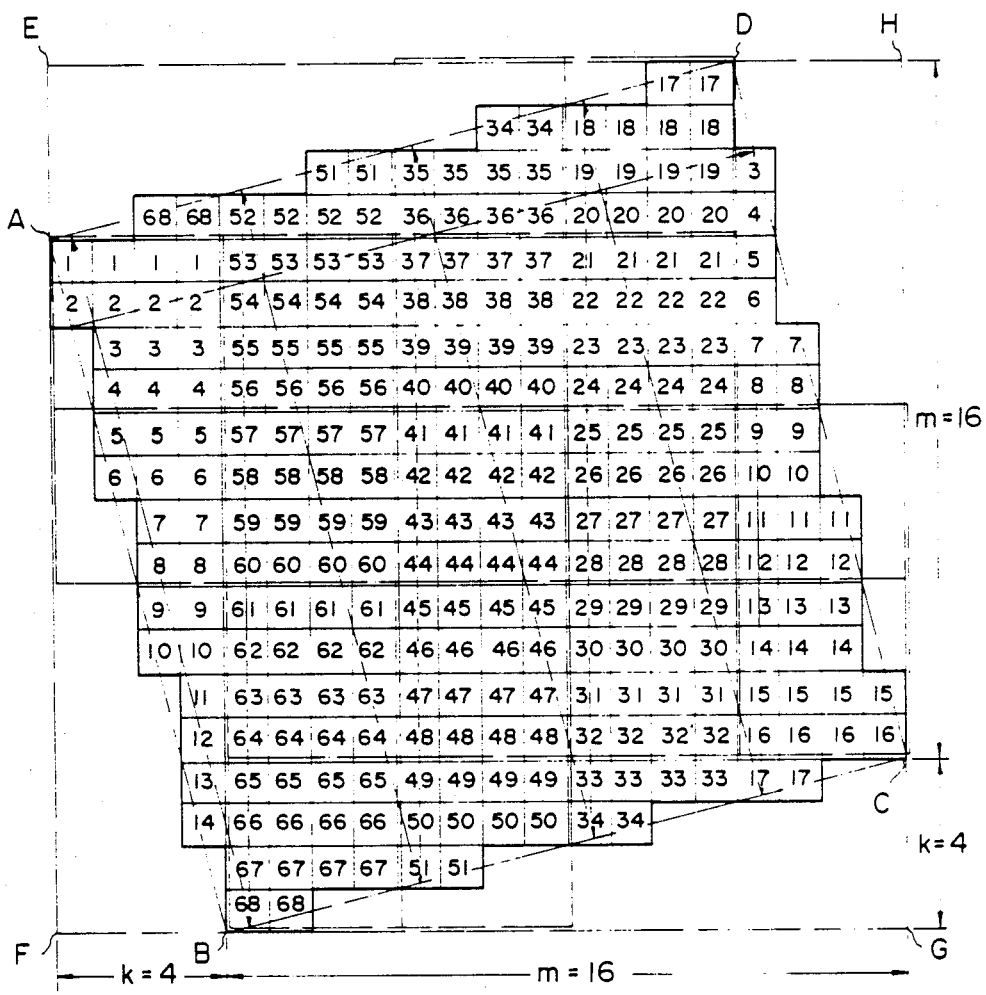
FIG. 22 shows a quantized halftone dot area having a screen angle $\theta$ whose tan $\theta$ equals 4/16, together with address numbers of its picture elements.

In such an embodiment, the growing process of the black dot patterns and the growing process of the white dot patterns can be substantially the same. Actually, the arrangements of the central picture elements of the black and the white dot patterns are different, and therefore the perfect symmetry can not be obtained. In order to obtain the symmetry of the black dot and the white dot substantially, $m+k$ is determined to an even number, and the arrangements of the central picture elements of the black and the white dot patterns are made to the same. One embodiment of this case is shown in FIG. 22.

Figure 15:
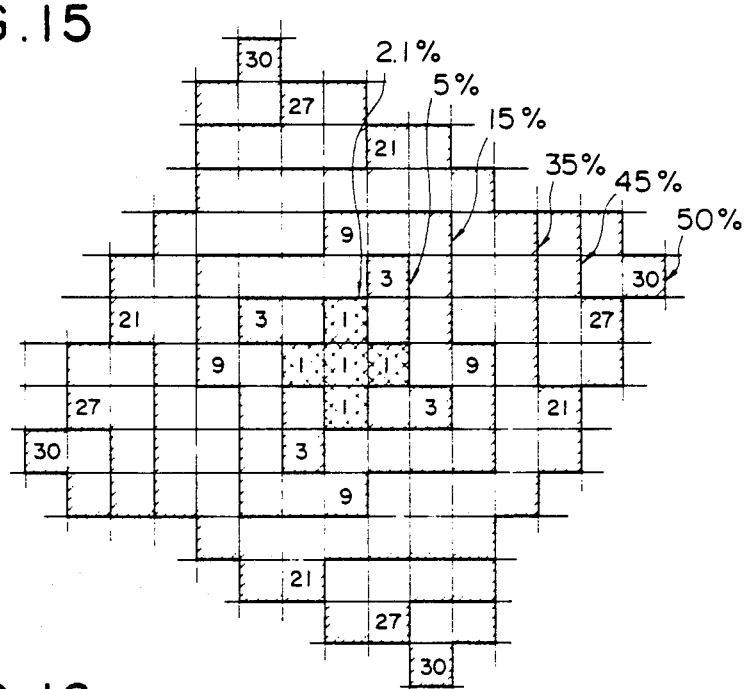
FIG. 15 shows quantized halftone dot patterns having halftone dot area rates of up to 50%, formed around a halftone dot center or a black dot center.
Figure 16:
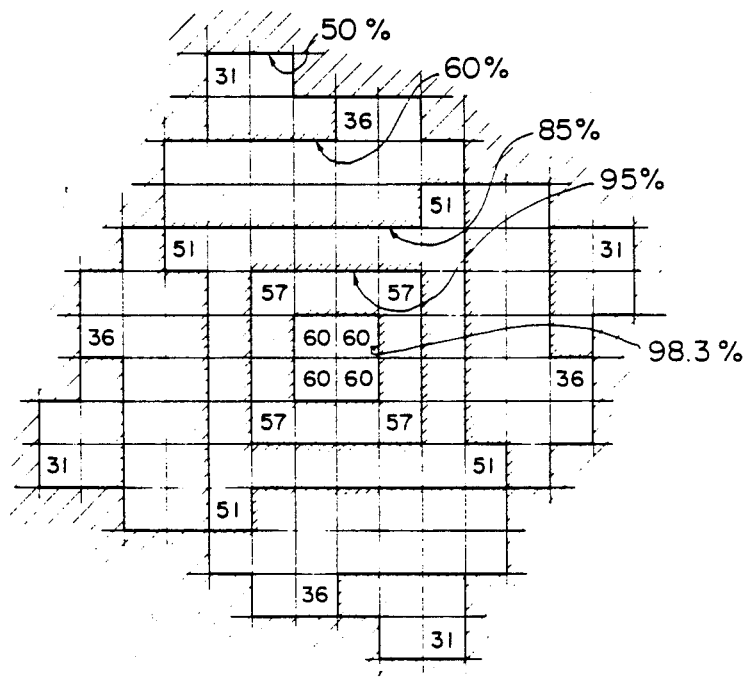
FIG. 16 shows quantized white dot patterns having halftone dot area rates of more than 50%, formed around a white dot center.

As described above, the halftone dot patterns or the black dot patterns and the white dot patterns of 60 steps are produced and shown in FIGS. 15 and 16. FIG. 15 shows typical black dot patterns having the halftone dot area rates of at most 50%, and FIG. 16 shows typical white dot patterns having the halftone dot area rates of at least 50%.

In FIGS. 15 and 16, the shaded sides of the outlines of the halftone dot patterns show the black parts, and the numbers indicate the step numbers corresponding to the halftone dot area rates.

In this embodiment, since the shown halftone dot patterns are quantized by the picture elements, the halftone dot area rates are expressed by the percentages of the picture elements of the black dot patterns with respect to all the picture elements of the halftone dot area.

The step numbers used for the determination of the shapes of the halftone dot patterns correspond to the kinds of the halftone dot patterns, and the halftone dot area rates. Hence, the step numbers can be the values corresponding to the densities.

The numbers affixed to the memories $29_0$–$29_{60}$ of FIG. 4 correspond to the step numbers obtained depending on the halftone dot patterns. For instance, therefore, the memory $29_{30}$ stores the halftone dot pattern of the step number 30.

Figure 17:
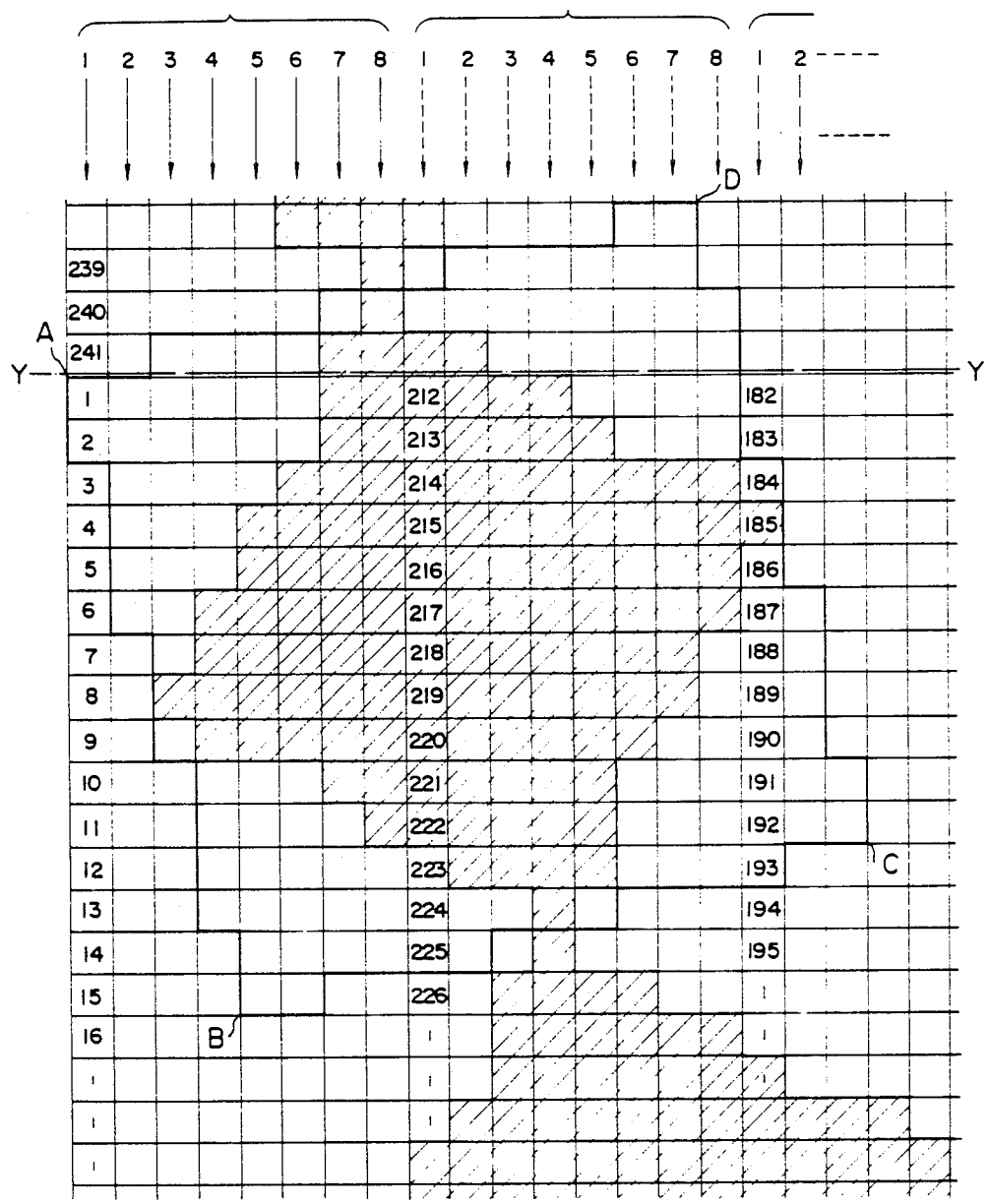
FIG. 17 shows a halftone dot pattern having a halftone dot area rate of 50%, address numbers of picture elements, and light beam paths.

In FIG. 17 there is shown the halftone dot pattern having the halftone dot area rate of 50% in the quantized halftone dot areas, whose picture elements are partially attached by the address numbers, together with the light paths. The halftone dot pattern having the halftone dot area rate of 50% is read out of the memory $29_{30}$ for recording it onto the photosensitive material as follows.

In FIG. 17, a one-dotted line Y—Y shows the scanning start line whose position is determined by the start pulse $g_9$, as described above. Eight arrows shown by solid lines indicate the first scanning positions and directions of the eight scanning lines corresponding to the eight exposure light paths $17_1$–$17_8$, and eight arrows shown by broken lines show the second scanning positions and directions of the same. The address numbers for looking up the arrangement of the picture elements of the halftone structure along the first light path correspond to the addresses of the memory $29_{30}$.

The pattern data, each being composed of the eight bit binary codes such as "1" and "0" for the black and the white dot patterns, which are aligned in the moving direction of the head and represent the eight picture elements aligned in series in the same direction, is stored in the corresponding addresses of the memory $29_{30}$.

FIG. 18 shows a memory map of the memory $29_{30}$ for recording the halftone dot pattern having the halftone dot area rate of 50%, which is prepared as described above. The other memories $29_1$–$29_{29}$ and $29_{31}$–$29_{59}$ store the pattern data prepared in the same manner as described above for the corresponding halftone dot patterns. The memories $29_0$ and $29_{60}$ stores the data for the entire white and the entire black, and in fact these memories should not be memories and can be replaced with the other simple means in spite of the fact that they are shown as the memories in FIG. 4.

Then, the recording process of the halftone dot pattern of the halftone dot area rate of 50% according to the pattern date stored in the memory $29_{30}$, as shown in FIG. 17, will be described in connection with FIG. 4.

In the first scanning process, the initial preset value "1" is taken from the memory 31 into the address counter 30 by the start pulse $g_9$, and then the address counter 30 outputs consecutively the address signals to the memory $29_{30}$ in order to read out the pattern data stored in the memory $29_{30}$.

In the memory 31, the address numbers of the picture elements of the quantized halftone dot areas, aligned from the first picture element along the scanning start line in the direction of the moving of the head, are read out every eight addresses and are stored as the initial preset values, as hereinbefore mentioned, for example, the first address number "1" and then "212", "182", "152", "122", and so forth.

These address numbers can be obtained in the halftone dot area shown in FIG. 11, as described above. For example, after the first and the second address numbers "1" and "212", the third address number "182" is out of the halftone dot area, and is found in the corresponding position therein.

Further, the address numbers aligned in the progression of differences in the row direction, as described above, the address numbers which are read out every eight addresses in the row direction are also aligned in a certain progression of the differences. In the progression of the differences, when one of the adjacent address numbers is known, the other can be calculated readily.

Figure 19:
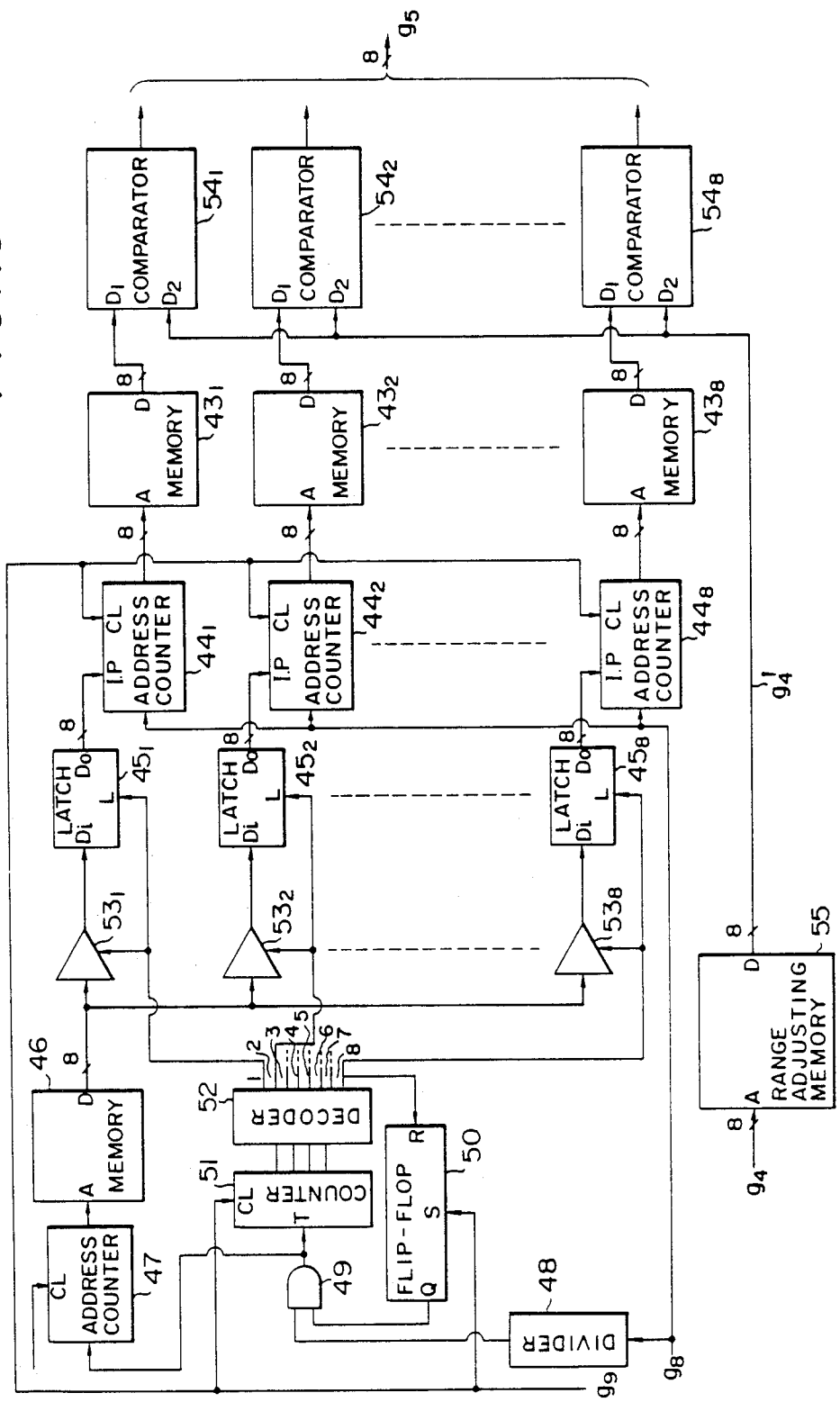
FIG. 19 is a block diagram of another embodiment of a halftone dot controller shown in FIG. 1.

Therefore, the memory 31 can be replaced with a digital arithmetic means which calculates the preset values in the order of the progression of the differences. In FIG. 19 there is shown another embodiment of the halftone dot controller 14 shown in FIG. 1. In this embodiment, the halftone dot patterns of the different halftone dot area rates are determined to 241 steps corresponding to 241 picture elements. The address numbers of the picture elements of the halftone dot area of FIG. 11 correspond to the step numbers shown in FIGS. 20 and 21.

The step numbers of the picture elements having the address numbers are stored in common in the corresponding addresses of eight memories $43_1$–$43_8$ in the same form. Each of the memories $43_1$–$43_8$ is addressed by a base 241 address counter $44_1$, $44_2$, . . . , or $44_8$ which counts the clock pulses $g_8$ and changes the addresses.

The initial preset values are input to the address counters $44_1$–$44_8$ from latch circuits $45_1$–$45_8$ wherein the initial preset values are latched. The initial preset values are stored in a memory 46 in advance. The address numbers of the picture elements of the quantized halftone dot area, which are aligned on and along the scanning start line in the row direction from the first picture element including the point A, as shown in FIG. 11, are stored in the memory 46 in its address order, and circulates from the 241th number to the first number.

The memory 46 is addressed by a base 241 address counter 47 which receives a pulse output from a divider 48 via an ANG gate 49, as hereinafter described in detail.

The clock pulses are input to the divider 48 which diminishes the number of the clock pulses successively, and outputs the pulse to the AND gate 49 normally closed. When the start pulse $g_9$ is input to a set terminal S of a flip-flop circuit 50, the flip-flop circuit 50 sends a signal to the AND gate 49 so as to open it. Then, the pulse generated by the divider 48 is fed to the address counter 47 and a binary counter 51 through the AND gate 49.

The binary counter is cleared by the start pulse $g_9$ to zero whenever the AND gate 49 is to be opened. It counts the pulses passed through the AND gate 49, and send a four bit binary code to a decoder 52. Then, the decoder 52 outputs a signal to one of its eight output lines.

Now, when the binary counter 51 counts eight pulses, and outputs a binary code corresponding to 8 to the decoder 52 The decoder 52 outputs the signal on the eighth output line, and this output signal is fed to a reset terminal R of the flip-flop circuit 50, thereby resetting it and closing the AND gate 49.

In the same time, soon after the start pulse $g_9$ is output from the timing controller 27, the pulse passed through the AND gate is fed to the address counter 47, as described above. The address counter 47 counts up the input pulses, increases the count number, and addresses the address numbers of the memory 46 one by one in the numerical order, while the binary counter 51 counts up the input pulses, and sends the code to the decoder 52. Then, the decoder 52 outputs the signal to one of bus controllers $53_1$–$53_8$ connected to the eight output lines thereof so as to open it, and to the latch terminal L of one of the latch circuits $45_1$–$45_8$. Therefore, the address numbers of the picture elements aligned in the scanning start line, consecutively read out of the memory 46, are successively distributed to the latch circuits $45_1$–$45_8$ as the initial preset values via the bus controllers $53_1$–$53_8$, and are latched there before the start of the scanning.

The address counters $44_1$–$44_8$ for the memories $45_1$–$45_8$ receive the initial preset values (the address numbers of the picture elements aligned along the scanning start line of FIG. 17) which are latched in the latch circuits $45_1$–$45_8$ by means of the start pulses $g_9$.

The address counters $44_1$–$44_8$ output the address codes which correspond to the address numbers aligned in the fixed order repeatedly, as shown in FIG. 11, to the corresponding positions on the scanning surace by using the clock pulses $g_8$ and the start pulses $g_9$.

The halftone structure having the desired screen angle whose tangent value $\tan \theta$ equals k/m, is determined before the address counters $44_1$–$44_8$ output the codes. Accordingly, the forms of the halftone dot patterns in the halftone dot area, the black dot center, the growing process of the black dot patterns, the white dot center, the converging process of the white dot patterns, and so forth can be selected apart from the halftone structure.

In FIG. 19, the memories $43_1$–$43_8$ output the step numbers according to the address numbers of the picture elements, addressed by the address counters $44_1$–$44_8$, to respective comparative input terminals of magnitude comparators $54_1$–$54_8$.

The eight bit digital picture signal $g_4$ having a density range of 256 steps is fed to a range adjusting memory 55 in which the density range of 256 steps of the digital picture signal $g_4$ is converted into 242 steps on the basis of the number of the picture elements included in one halftone dot area quantized to obtain a range-converted digital picture signal $g_4'$. This range-converted digital picture signal $g_4'$ is input to the other comparative input terminals of the magnitude comparators $54_1$–$54_8$.

In this embodiment, the step numbers are numbered from "1" to "241" successively corresponding to the kinds of the halftone dot patterns, and one step for the entire white pattern is added. Accordingly, 242 steps are required for these 242 patterns to be reproduced. This density range conversion of the digital picture signal $g_4$ from 256 steps to 242 steps is carried out in the range adjusting memory 55. Alternatively, a proper number of steps of 256 steps are forced to be blank at a certain interval, thereby adjusting the range to 242 steps, as described above.

Each magnitude comparator $54_1, \ldots,$ or $54_8$ outputs a binary code "1" or a high level signal "H" when the picture signal $g_4'$ is at least the same as the step number, and a binary code "0" or a low level signal "L" when the picture signal $g_4'$ is less than the step number. The output signal of the magnitude comparators $54_1$–$54_8$ is sent as the exposure light control signal $g_5$ to the light path open-close control means 16 shown in FIGS. 1 and 2.

In this embodiment, the picture signal $g_4'$ or $g_4$ is sent to the magnitude comparators, in common, and the basic halftone structure on the scanning lines of the magnitude comparators $54_1$–$54_8$ are determined before the comparison of the signals therein. Hence, the level unification or the particular interrelation of the picture signals input to the magnitude comparators $54_1$–$54_8$ are not necessary. Further, in this embodiment, when the different picture signals are independently fed to the magnitude comparators $54_1$–$54_8$, the resolving power of the recoded picture can be raised.

Figure 20:
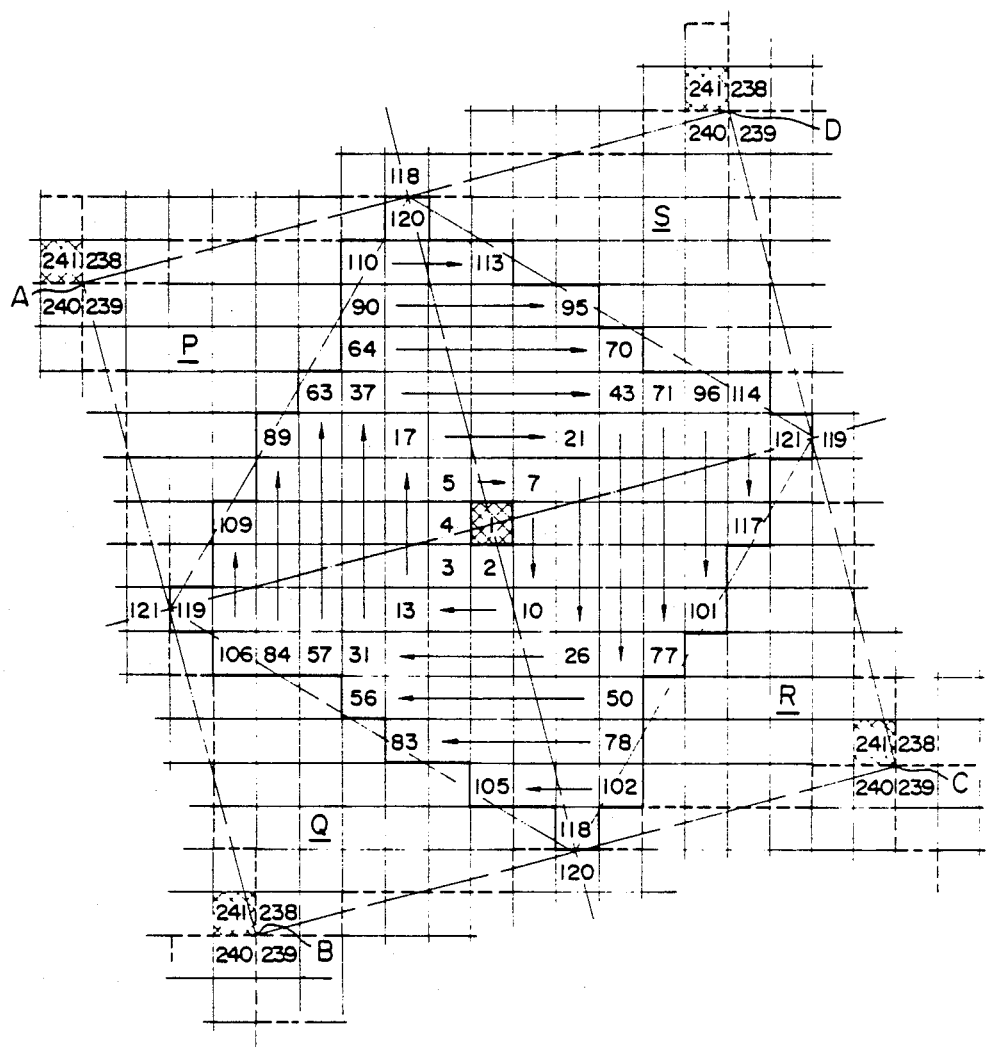
FIG. 20 shows a halftone dot pattern together with step numbers used in the halftone dot controller of FIG. 19.
Figure 21:
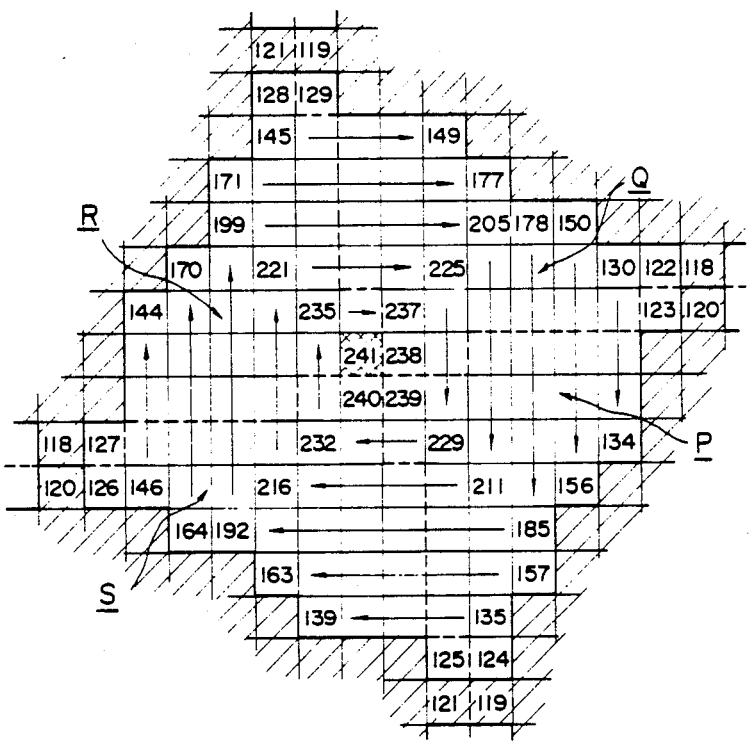
FIG. 21 shows a white dot pattern having a halftone dot area rate of 50% together with step numbers used in the halftone dot controller of FIG. 19.

In FIGS. 20 and 21, there are shown step numbers of the picture elements of the halftone dot area, which are determined around the black dot center and the white dot center up to the halftone dot area rate of 50% and at least the halftone dot area rate of 50% depending on the characters of the halftone dot patterns.

In FIG. 20, the initial position of the minimum halftone dot pattern is the center of the halftone dot area, i.e. the address number "153" of FIG. 11, and is determined to the step number "1". The halftone dot pattern grows stepwise and clockwise from "1" to "121" steps in a swirl form corresponding to the picture elements.

As shown in FIG. 21, the white dot pattern converges onto one of the four picture elements arranged around the vertex A, B, C or D of the halftone dot area. For example, the minimum white dot position is determined to the picture element having the address number "64" shown in FIG. 13, to which the maximum step number "241" is attached. The white dot pattern converges stepwise from "122" to "241" steps in a swirl form corresponding to the picture elements. This process is approximately symmetrical to the growing process of the black dot pattern.

These step numbers correspond to the halftone dot area rates of the halftone dot patterns formed in the halftone dot area which is quantized by the picture elements. The step numbers or the halftone dot area rates can be determined apart from the arrangement of the step numbers or the shapes of the halftone dot patterns.

It is not always necessary to number the step numbers successively, for example, the step numbers can be skipped at a certain interval to obtain the last step number of "255". In this case, the range adjusting memory 55 of FIG. 19 can be omitted.

Since the step numbers correspond to the halftone dot area rates of the halftone dot patterns, the halftone dot pattern corresponding to the density value of the picture signal $g_4$ can be picked up by comparing the step number with the density value of the picture signal $g_4$.

Further, the arrangement of the step numbers attached to the picture elements of the quantized halftone dot area, for which the determination of the shapes of the halftone dot patterns is carried out, is irrelevant to the basic halftone structure. Therefore, the step numbers can be arranged at random, with the result that the halftone dot pattern can be recorded with the desired density distribution in the basic halftone structure having the desired screen angle, which can not be carried out by a conventional method. This means that the change of the halftone characteristics can be performed by the arrangement of the step numbers.

This change of the step number arrangement is carried out by replacing the stored data in the memories $43_1$–$43_8$, and the data is stored in the memories $43_1$–$43_8$ in the same form. Accordingly, this replacement of the data can be performed by addressing in common. It is readily understood that only the halftone characteristics can be selectively and freely varied without changing the basic halftone structure.

On the other hand, the change of the screen angle, in particular, the change to the symmetrical basic halftone structure having the enantiomorphous relation such as a relation between the screen angles 15° and −15° is carried out in the following manner.

In the embodiment shown in FIG. 19, the address counter 47 for addressing the memory 46 to read out the initial preset values is counted down, and the memory 46 is addressed by the output signal of the address counter 47.

That is, the memory 46 which stores the address numbers of the picture elements aligned in the row direction or the moving direction of the head, is addressed in the down count address order, and thus the memory 46 reads out the address numbers of the picture elements aligned in the reverse direction to the row direction, thereby producing a basic halftone structure or a halftone dot pattern turned over with respect to the column direction, i.e. an enantiomorphous basic halftone structure.

In the embodiment of FIG. 4, such a change of the screen angle can be carried out in the similar manner to the above description. That is, the address counter 33 which addresses the memory 31 storing the initial preset values, is counted down, and then the memory 31 is addressed by the output signals of the address counter 33 to output the initial preset values in the reverse order. In this case, the eight picture elements aligned in the row direction are processed as one set, and accordingly the alignment of the eight picture elements must be reversed with respect to the alignment of the exposure light paths $17_1$–$17_8$.

For example, when the data is fed from the memories $29_0$–$29_{60}$ to the register 34, the bit alignment of the register 34 is turned upside down. Alternatively, the eight bit binary codes of the exposure light control signal $g_5$ are connected in the reverse order to the light path open-close control means 16.

Such a symmetrical change of the screen angle or the basic halftone structure is very important when the color separation printing plates are prepared. For example, the screen angles of the printing plates for cyan and magenta can be selected to +15° and −15°, respectively, and the obtained basic halftone structures having the screen angles +15° and −15° have an enantiomorphous relation each other.

Next, another embodiment of the present invention wherein the rational number k/m has a measure will be described in connection with FIGS. 22–24.

In FIG. 22 there is shown a quantized halftone dot area having a screen angle $\theta$ whose tan $\theta$ equals 4/16, together with address numbers attached to the picture elements. In this embodiment, since tan $\theta = k/m$ has the measure N, another regularity concerning tan $\theta = 1/N$ can be found in the quantized basic halftone structure.

Figure 23:
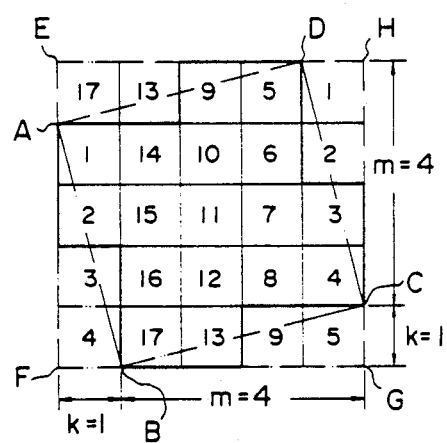
FIG. 23 shows a quantized halftone dot area having a screen angle $\theta$ whose tan $\theta$ equals $\frac{1}{4}$, together with address numbers of its picture elements.

In FIG. 23 there is shown a quantized halftone dot area having a screen angle $\theta$ whose tan $\theta$ equals $\frac{1}{4}$ which is obtained by dividing k/m = 4/16 by a measure N = 4, as shown in FIG. 22, together with address numbers of the picture elements.

FIGS. 22 and 23 show the halftone dot areas of substantially equivalent basic halftone structures. That is, the halftone dot area shown in FIG. 23 can be superposed upon the halftone dot area shown in FIG. 22, as shown by imaginary lines in FIG. 22. In FIG. 22, by transferring the picture elements to the corresponding positions, the shape of the halftone dot area wherein 16 picture elements regarding 4/16 correspond to one picture element of FIG. 23, can be formed to a similar figure to that shown in FIG. 23.

In this embodiment, the numbering of the step numbers to the picture elements of the halftone dot area can be carried out in the same manner as those of FIGS. 12, 14, 20 and 21, as described above, depending on the desired halftone characteristics. The random arrangement of the step numbers can also be performed in the same manner as described above.

In the embodiment of FIG. 22, the total number of the picture elements included in one halftone dot area is 272 which is 16 steps wider than the range of the eight bit picture signal $g_4$. Therefore, the step numbers should be reduced to 256 by repeatedly numbering the same step number to the adjacent two picture elements every 16 steps.

Figure 24:
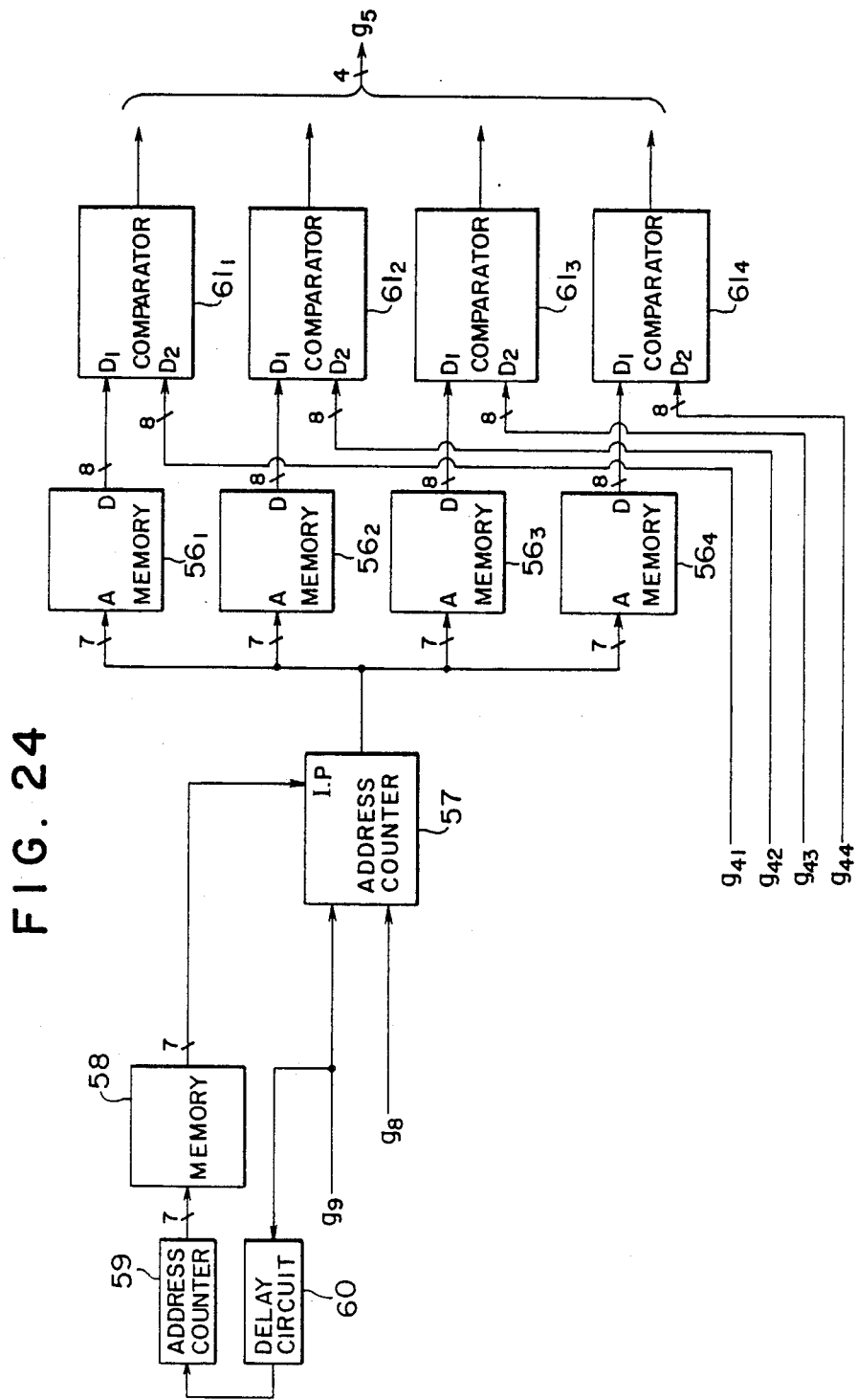
FIG. 24 is a block diagram of still another embodiment of a halftone dot controller of FIG. 1 for recording the halftone dot pattern shown in FIG. 22.

In FIG. 24 there is shown still another embodiment of the halftone dot controller shown in FIG. 1 for recording the halftone dot pattern of FIG. 22.

In memories $56_1$–$56_4$ the step numbers "1"–"68" of four groups corresponding to the measure N = 4 are stored independently with respect to the address numbers of the memories $56_1$–$56_4$. As shown in FIG. 22, the four lines of picture elements aligned in the column direction are numbered with the same address numbers, and are controlled to be recorded along the scanning lines in the same time.

In this embodiment, four exposure light paths are provided in the exposure light source means 15, and the pickup head 5 is provided with four independent photoelectric elements corresponding to the four scanning lines. The four photoelectric elements pick up four analog picture signals in parallel, and the four analog picture signals are sent to the A/D converter 11, the picture signal processing section 12, and the magnification converter 13 successively in the same manner as described above, thereby obtaining four digital picture signals $g_{41}$, $g_{42}$, $g_{43}$ and $g_{44}$ in parallel.

The memories $56_1$–$56_4$ are addressed in common by a base 68 address counter 57 whose address is advanced by the clock pulse $g_8$. The address numbers of the picture elements aligned in the row direction are stored in a memory 58 in the address order as the initial preset values for the scanning start positions aligned along the line Y—Y of FIG. 17, and are read out of the memory 58 successively in order to be fed to the address counter 57. In this case, one address number is used in common for four picture elements aligned in series in the row direction, in the similar manner to the embodiment described above.

The memory 58 is addressed by a base 68 address counter 59. The start pulse $g_9$ is sent to a delay circuit 60 and is delayed there at a certain time. The delayed start pulse advances the address number of the address counter 59. The delay time is so determined that the address counter 57 may be cleared by the start pulse $g_9$ at the scanning start position and receive the initial preset value.

The step numbers output from the memories $56_1$–$56_4$ and the digital picture signals $g_{41}$, $g_{42}$, $g_{43}$ and $g_{44}$ are fed to magnitude comparators $61_1$–$61_4$ of the same type as those of FIG. 19, and are compared therein in the same manner as described above.

In this embodiment, the picture signals $g_{41}$, $g_{42}$, $g_{43}$ and $g_{44}$ may be analog picture signals, and the output signals of the memories $56_1$–$56_4$ are once converted into analog signals. Then, the two kinds of signals are compared in analog comparators, with the result of the same halftone dot patterns as those obtained in the above embodiment without any change.

Each magnitude comparator $61_1$, $61_2$, $61_3$ or $61_4$ outputs a binary code depending on the density value of the picture signal $g_{41}$, $g_{42}$, $g_{43}$ or $g_{44}$. Thus the obtained four bit binary code signal $g_5$ representing the halftone dot pattern to be recorded is sent to the light path open-close control means 16 shown in FIGS. 1 and 2, in the same manner as described above. The binary code output from the magnitude comparator $61_1$, $61_2$, $61_3$ or $61_4$ controls the first, the second, the third or the fourth light path $17_1$, $17_2$, $17_3$ or $17_4$.

In this embodiment, the change of the screen angle can be readily performed by addressing the memory 58 which stores the initial preset values, by the down count of the address counter 59, in the same manner as described above. On this occasion, the memories $56_1$–$56_4$ should be connected to the magnitude comparators $61_1$–$61_4$ in the reverse order.

Although the present invention has been explained with respect to the halftone dot area having an originary screen angle such as 15° or −15°, however, of course, the halftone dot areas having the particular screen angles such as 0° and 45° may be employed when the color separation printing plates are produced. Now, the present invention will be described in connection with the halftone dot areas having the screen angles 0° and 45°.

When the screen angle $\theta$ is 0° or 45°, its tangent value $\tan \theta = k/m$ has a particular value: when the screen angle is 0°, k equals 0, and when the screen angle is 45°, k equals m.

Generally, in order to remove "moire", the screen ruling of a set of color separation plates is selected to be the same. According to the present invention, however, since the halftone dot area is quantized by the picture elements, it is difficult to equalize the screen ruling when the screen angle is different in some halftone dot areas. The method disclosed in the Japanese patent publication No. 52-49361 abovementioned also involves this difficulty.

However, according to the present invention, in practice, the influence of the "moire" can be substantially eliminated by determining the very similar screen rulings to the color separation plates. The basic halftone structure and the halftone characteristics can be determined independently. Hence, the "moire" caused by determining the different screen rulings to the color separation plates can be reduced largely by properly selecting the halftone characteristics.

When the screen rulings of the color separation plates are the same, their halftone dot areas become the same, and consequently the total numbers S of the picture elements of the quantized halftone dot areas are the same.

Now, when the screen angle $\theta$ is 0° or 45°, the total number S of the picture elements included in the quantized halftone dot area is obtained as follows.

$$\tan \theta = k_\theta/m_\theta, \quad S_\theta = m_\theta^2 + k_\theta^2$$

$$\tan 0° = 0/m_0, \quad S_0 = m_0^2$$

$$\tan 45° = k/m = m_{45}/m_{45}, \quad S_{45} = 2m_{45}^2$$

Then, when $S_\theta$, $S_0$ and $S_{45}$ are the same, $m_0$ and $m_{45}$ are obtained as follows.

$$m_0 = \sqrt{S_\theta}$$

$$m_{45} = \sqrt{S_\theta/2}$$

Since the halftone dot area is quantized by the picture elements, $m_0$ and $m_{45}$ become integral numbers most approximate to $\sqrt{S_\theta}$ and $\sqrt{S_\theta/2}$.

For instance, when the tangent value $\tan \theta$ equals 4/15 ($\theta \approx 15°$), the total numbers of the picture elements concerning the screen angles 0° and 45° are obtained as follows while $S_\theta$ equals 241.

$$m_0 \approx 16, \; S_0 = 256; \text{ and } m_{45} \approx 11, \; S_{45} = 242$$

Figure 25:
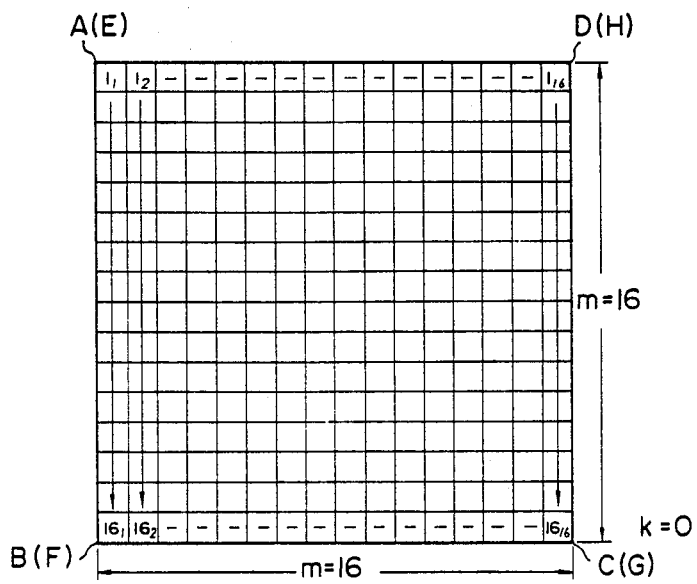
FIG. 25 shows a halftone dot area quantized having a screen angle of 0 degree, corresponding to the one shown in FIG. 11.
Figure 26:
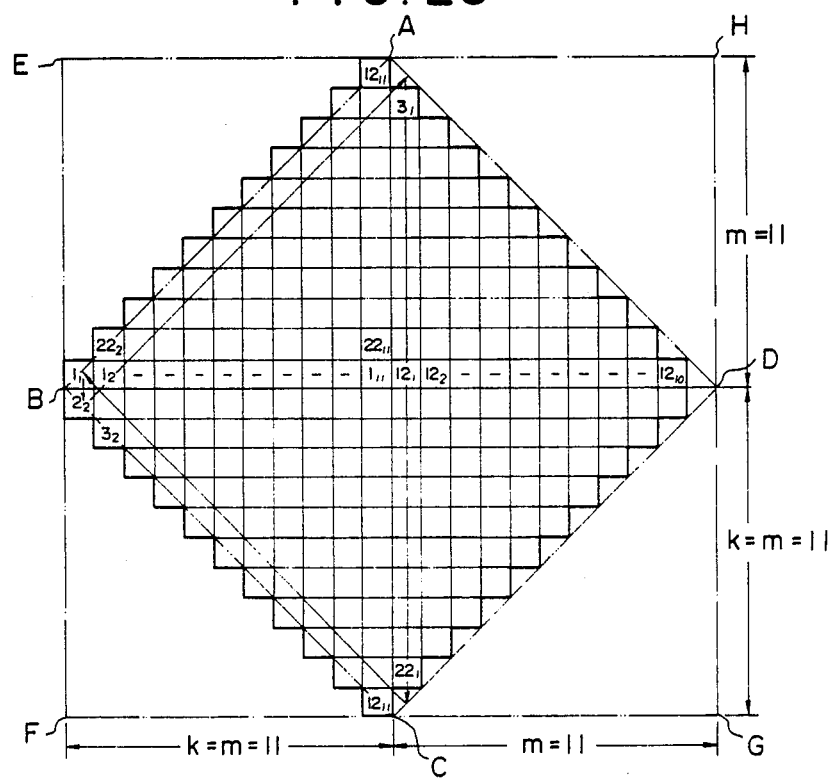
FIG. 26 shows a halftone dot area quantized having a screen angle of 45 degree, corresponding to the one shown in FIG. 11.

In FIGS. 25 and 26, there are shown the halftone dot areas having the screen angles 0° and 45°, which are obtained depending on the above values.

Then, the screen pitches are obtained from the above values as follows, wherein p means the scanning line pitch.

$$T_\theta \approx T_{15} = \sqrt{241} = 15.524(p),$$

$$T_0 = \sqrt{256} = 16(p), \text{ and}$$

$$T_{45} = \sqrt{242} = 15.556(p).$$

In this embodiment, as described above, when the screen angle θ is 0°, a relatively large declination appears. But the color separation plate having the screen angle 0° is usually used for the yellow plate on which the moire is mostly inconspicuous, and therefore there is no trouble in practice.

On the other hand, in the color separation plates for cyan and magenta on which the moire is conspicuous, the screen angles are determined to 15° and −15°, i.e. the screen rulings can be the same.

Further, in the color separation plate for black, the screen angle is determined to 45°, and its screen ruling can be almost the same as those of the screen angles 15° and −15°.

In the embodiments described above, since the sampling is carried out by using the clock pulse $g_8$ shown in FIG. 1, the halftone dot area is quantized at the period of the clock pulse $g_8$ in the column direction. Accordingly, the pitch of the picture element (the scanning line pitch p of the halftone dot area) of the resultant basic halftone structure in the scanning direction corresponds to the period of the clock pulse $g_8$.

That is, the period of the clock pulse $g_8$ should correspond to the scanning line pitch p. When the period of the clock pulse is determined to half of the scanning line pitch p, the picture element having the pitch p can be divided further into two pieces. This means that the total number of the picture elements becomes double, and the step number corresponding to the halftone dot area rates becomes double. Hence, the resolving power in the scanning direction can be raised. In this case, since the order of the picture elements in the column direction is not changed, no trouble in the basic halftone structure occurs.

It is readily understood from the above description that according to the present invention a reproduction picture may be recorded with a high resolving power, and the capacity of the memories can be greatly reduced.

Although the present invention has been described in some detail by way of illustration and examples for purposes of clarity of understanding, it will, of course, be understood that various changes and modifications thereof may be made in the form, details, and arrangements of the parts without departing from the scope of the present invention.

What is claimed is:

1. A method for producing a halftone plate from an original picture having a continuous tone directly, for use in a picture reproducing machine wherein a reproduction picture is recorded on a photosensitive material by means of a plurality of exposure light beams which are independently modulated by picture signals obtained by scanning the original picture, the improvement which comprises the steps of:
    (a) dividing a halftone dot area into picture elements depending on a screen angle approximate to the desired screen angle, whose tangent value is a rational number;
    (b) assigning addressing numbers to the picture elements of the divided halftone dot area in a predetermined order;
    (c) storing data for halftone dot area rates and forms of halftone dot patterns into addresses of memories which are addressed by a common address number;
    (d) selecting one of the memories depending on the picture signals obtained by scanning the original picture;
    (e) reading the data out of the selected memory in parallel; and
    (f) controlling the exposure light beams according to the read-out data, thereby producing a halftone plate.

2. A method as defined in claim 1, wherein the screen angle θ is so determined that its tangent value tan θ=k/m may be an irreducible fraction.

3. A method as defined in claim 1, wherein the screen angle θ is so determined that its tangent value tan θ=k/m may be a rational number having a measure N.

4. A method as defined in claim 1, wherein the screen angle θ is determined to 45 degree, and wherein k and m of its tangent value tan θ=k/m are determined to the same integral number most approximate to $\sqrt{S/2}$ wherein S means the total number of the picture elements included in the halftone dot area.

5. A method as defined in claim 1, wherein the screen angle θ is determined to zero degree, and wherein k and m of its tangent value tan θ=k/m are determined to nought and an integral number most approximate to $\sqrt{S}$ wherein S means the total number of the picture elements included in the halftone dot area, respectively.

6. A method as defined in claim 2, wherein the address numbers are attached to the picture elements of the halftone dot area by transferring the address numbers which are aligned in the numerical order and are attached to the picture elements aligned along one scanning line in the scanning direction, to the corresponding positions of the halftone dot area.

7. A method as defined in claim 3, wherein the address numbers are attached to the picture elements of the halftone dot area by transferring the address numbers which are aligned in the numerical order and are attached to the picture elements aligned along the N number of scanning lines in the scanning direction, to the corresponding positions of the halftone dot area, with the result that each address number is attached to the N number of picture elements.

8. A method as defined in claim 1, wherein the data for the halftone dot area rate and the form of each of the different halftone dot patterns is stored in each memory in the form of binary codes corresponding to the address numbers of the picture elements.

9. A method as defined in claim 1, wherein the data for the halftone dot area rate and the form of each of the different halftone dot patterns is stored in each of the memories corresponding to the scanning lines, in the form of weighting numbers corresponding to the address numbers of the picture elements.

10. A method as defined in claims 1, 2, 3, 4, 5, 6, 7, 8 or 9, wherein step numbers of the halftone dot patterns are adjusted to the digital density range of the picture signal by skipping or repeating the weighting numbers corresponding to the address numbers of the picture elements.

11. A method as defined in claims 1, 2, 3, 4, 5, 6, 7, 8 or 9, wherein the weighting numbers corresponding to the address numbers of the picture elements are arranged at random in the halftone dot area, thereby obtaining a halftone dot pattern having a density distribution.

12. A method as defined in claim 1, wherein a plurality of the picture elements aligned in series in the moving direction of the head are grouped to one set and one of the address numbers of the set of the picture elements is selected to a representative address number, and wherein the selected memory is addressed by the representative address number to output the data for the set of the picture elements in parallel.

13. A method as defined in claims 1 or 9, wherein the weighting numbers read out of the memories are compared with the picture signals to obtain the data representing the desired halftone dot pattern.

* * * * *